United States Patent
Sela et al.

(10) Patent No.: US 11,088,845 B2
(45) Date of Patent: Aug. 10, 2021

(54) NON-VOLATILE MEMORY WITH REPLAY PROTECTED MEMORY BLOCK HAVING DUAL KEY

(71) Applicant: Western Digital Technologies, Inc., San Jose, CA (US)

(72) Inventors: Rotem Sela, Hod Hasharon (IL); Miki Sapir, Nes Ziona (IL)

(73) Assignee: Western Digital Technologies, Inc., San Jose, CA (US)

( * ) Notice: Subject to any disclaimer, the term of this patent is extended or adjusted under 35 U.S.C. 154(b) by 380 days.

(21) Appl. No.: 16/267,040

(22) Filed: Feb. 4, 2019

(65) Prior Publication Data

US 2020/0014544 A1    Jan. 9, 2020

Related U.S. Application Data

(60) Provisional application No. 62/693,578, filed on Jul. 3, 2018.

(51) Int. Cl.
*H04L 9/32* (2006.01)
*G06F 12/14* (2006.01)
*H04L 9/14* (2006.01)

(52) U.S. Cl.
CPC ........ *H04L 9/3242* (2013.01); *G06F 12/1466* (2013.01); *H04L 9/14* (2013.01); *G06F 2212/1052* (2013.01)

(58) Field of Classification Search
CPC ..... H04L 9/3242; H04L 9/14; G06F 12/1466; G06F 2212/1052

USPC ......................................................... 713/181
See application file for complete search history.

(56) References Cited

U.S. PATENT DOCUMENTS

| | | | | |
|---|---|---|---|---|
| 6,480,101 B1* | 11/2002 | Kelly | ................... | G06K 7/0008 340/10.2 |
| 2011/0119498 A1* | 5/2011 | Guyot | ................. | G06F 12/0866 713/189 |
| 2014/0095918 A1* | 4/2014 | Stahl | ..................... | G06F 21/725 713/500 |
| 2014/0250290 A1* | 9/2014 | Stahl | ..................... | G06F 9/4401 713/2 |
| 2016/0070656 A1* | 3/2016 | Babu | ..................... | G06F 21/572 711/163 |
| 2017/0185538 A1 | 6/2017 | Khan et al. | | |
| 2018/0103029 A1 | 4/2018 | Visinescu et al. | | |
| 2018/0314847 A1* | 11/2018 | Yeo | ....................... | H04L 9/0631 |
| 2019/0013079 A1* | 1/2019 | Blodgett | ................. | G06F 9/321 |
| 2019/0236031 A1* | 8/2019 | Kim | ....................... | G11C 16/22 |

OTHER PUBLICATIONS

NVM Express, Revision 1.2a, dated Oct. 23, 2015, NVM Express Group, 209 pages.

* cited by examiner

*Primary Examiner* — Michael S McNally
(74) *Attorney, Agent, or Firm* — Vierra Magen Marcus LLP

(57) ABSTRACT

An apparatus includes a Replay Protected Memory Block (RPMB) formed in a plurality of non-volatile memory cells. Control circuitry is configured to authenticate access to the RPMB with a plurality of keys. Authentication of write access to the RPMB is through a write key and authentication of read access to the RPMB is through a read key.

20 Claims, 18 Drawing Sheets

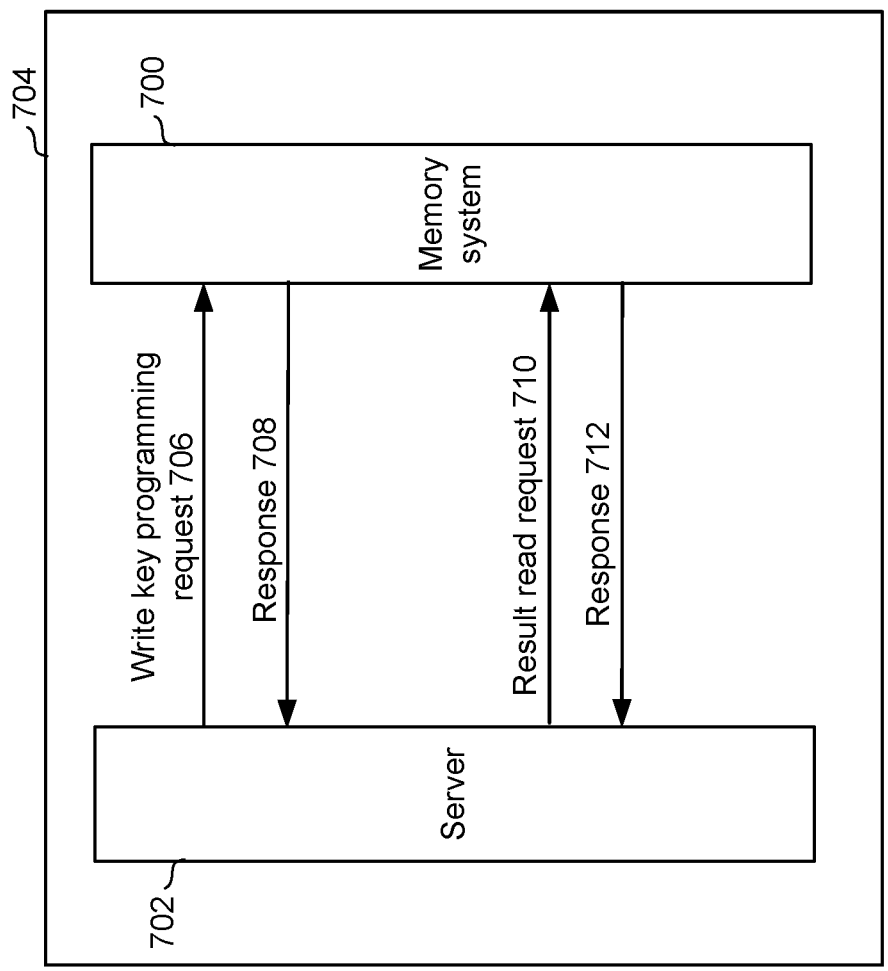

Figure 8

| IDN | Name | Access Property | Size | ATTRIBUTES Type #Ind. #Sel. | MDV | Description | Notes |
|---|---|---|---|---|---|---|---|
| 14h | bDeviceFFUStatus | Read Only | 1 byte | D | 00h | Device FFU Status<br>00h: No information<br>01h: Successful microcode update<br>02h: Microcode corruption error<br>03: Internal error<br>04h: Microcode version mismatch<br>05h-Feh: | 11 |
| 15h | bPSAState | Read/Persistent | 1 byte | D | Device Specific | 00h: 'Off'. PSA feature is off<br>01h: 'Pre-soldering'. PSA feature is on, device is in the pre-soldering state.<br>02h: 'Loading Complete' PSA feature is on. The host will set to this value after the host finished writing data during pre-soldering state<br>03h: 'Soldered'. PSA feature is no longer available. Set by the Device to indicate it is in post-soldering state. This attribute unchangeable after it is in 'Soldered' state. | |
| 16h | dPSADataSize | Read/Persistent | 8 bytes | D | 00<br>..<br>00h | The amount of data that the host plans to load to all logical units with bPSASensitive set to 1. | |
| 17h | RPMBRegion1WriteKey | WriteOnce, WriteOnly, Persistent | 32 bytes | D | 0x0 | RPMB Region 1 Write key is a write once, write only field. This key is used in order to write data to RPMB region 1. The field value is persistent (across power cycles and resets) and cannot be changed. | |

NON-VOLATILE MEMORY WITH REPLAY PROTECTED MEMORY BLOCK HAVING DUAL KEY

REFERENCE TO RELATED APPLICATIONS

This application claims the benefit of U.S. Provisional Patent Application No. 62/693,578, filed on Jul. 3, 2018, which is hereby incorporated by reference in its entirety.

BACKGROUND

Semiconductor memory is widely used in various electronic devices such as cellular telephones, digital cameras, personal digital assistants, medical electronics, mobile computing devices, non-mobile computing devices and data servers. Semiconductor memory may comprise non-volatile memory or volatile memory. A non-volatile memory allows information to be stored and retained even when the non-volatile memory is not connected to a source of power (e.g., a battery). Examples of non-volatile memory include flash memory (e.g., NAND-type and NOR-type flash memory), Electrically Erasable Programmable Read-Only Memory (EEPROM), and others.

In some cases, access to a portion of a non-volatile memory may be subject to security measures to protect data stored there from unauthorized access. Sensitive data may be stored in such an area. An example of an area of a non-volatile memory that is subject to such security measures is a Replay Protected Memory Block (RPMB).

BRIEF DESCRIPTION OF THE DRAWINGS

Like-numbered elements refer to common components in the different figures.

FIG. 7 illustrates an example of programming a write key for an RPMB.

FIG. 8 illustrates an example of configuring a write key as an attribute.

DETAILED DESCRIPTION

In some data storage systems, a portion of non-volatile memory may be configured as a Replay Protected Memory Block (RPMB) so that data stored in the RPMB is protected from unauthorized changes and can be read with a high degree of confidence that it is authentic. In an example, separate read and write keys are used to separately authenticate write access and read access (e.g. by different entities). This allows write access to be limited to one entity (such as a remote server) while read authentication may be applied to reads by one or more other entities (such as a host processor, or other processors coupled to the storage system), which may not have write access. Thus, a remote server may securely update data stored in RPMB (such as image version data, certificates, keys, etc.) with authentication that updates are from the remote server. A local processor (in a host or other system) may read data from the RPMB with authentication that read data is from the RPMB (not from another device).

In one embodiment, a non-volatile storage system comprises a controller and a three-dimensional memory structure connected to the controller. The three-dimensional memory structure includes a plurality of non-volatile memory cells divided into a boot partition, RPMB partition and a user data partition. The non-volatile storage apparatus is configured to provide role separation for accessing the RPMB partition.

Figure 1A:
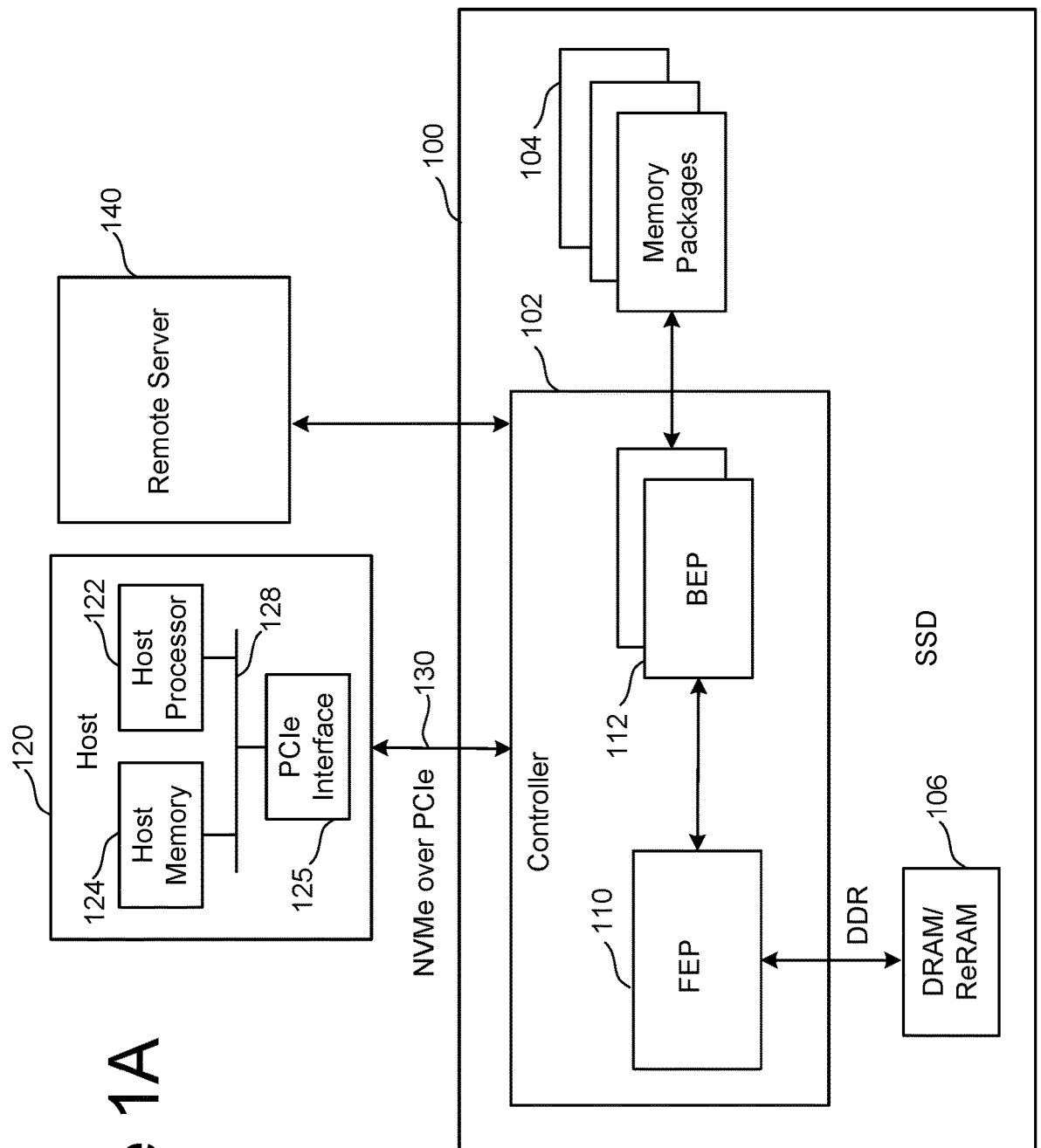
FIG. 1A is a block diagram of one embodiment of a memory system connected to a host.

FIG. 1A is a block diagram of one embodiment of a memory system 100 connected to a host 120. Memory system 100 can implement the technology proposed herein. Many different types of memory systems can be used with the technology proposed herein. One example memory system is a solid-state drive ("SSD"); however, other types of memory systems can also be used. Memory system 100 comprises a Controller 102, non-volatile memory 104 for storing data, and local memory (e.g. DRAM/ReRAM) 106. Controller 102 comprises a Front-End Processor Circuit (FEP) 110 and one or more Back End Processor Circuits (BEP) 112. In one embodiment FEP110 circuit is implemented on an ASIC. In one embodiment, each BEP circuit 112 is implemented on a separate ASIC. The ASICs for each of the BEP circuits 112 and the FEP circuit 110 are implemented on the same semiconductor such that the Controller 102 is manufactured as a System on a Chip ("SoC"). FEP110 and BEP 112 both include their own processors. In one embodiment, FEP110 and BEP 112 work as a master slave configuration where the FEP110 is the master and each BEP 112 is a slave. For example, FEP circuit 110 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). The BEP circuit 112 manages memory operations in the memory packages/die at the request of FEP circuit 110. For example, the BEP circuit 112 can carry out the read, erase and programming processes. Additionally, the BEP circuit 112 can perform buffer management, set specific voltage levels required by the FEP circuit 110, perform error correction (ECC), control the Toggle Mode interfaces to the memory packages, etc. In one embodiment, each BEP circuit 112 is responsible for its own set of memory packages. Controller 102 is one example of a control circuit.

In one embodiment, non-volatile memory 104 comprises a plurality of memory packages. Each memory package includes one or more memory die. Therefore, Controller 102 is connected to one or more non-volatile memory die. In one embodiment, each memory die in the memory packages 14 utilize NAND flash memory (including two-dimensional NAND flash memory and/or three-dimensional NAND flash memory). In other embodiments, the memory package can include other types of memory.

Controller 102 communicates with host 120 via an interface 130 that implements NVM Express (NVMe) over PCI Express (PCIe). For working with memory system 100, host 120 includes a host processor 122, host memory 124, and a PCIe interface 125. Host memory 124 is the host's physical memory, and can be DRAM, SRAM, non-volatile memory or another type of storage. Host 120 is external to and separate from memory system 100. In one embodiment, memory system 100 is embedded in host 120.

In one embodiment, controller 102 communicates with host 120 via a direct wired or wireless connection. In another embodiment, controller 102 communicates with host 120 via a network (e.g., LAN, WAN, Internet, etc.).

FIG. 1A also shows a remote server 140 in communicating with controller 102 via a direct wired or wireless connection or via a network (e.g., LAN, WAN, Internet, etc.). Remote server 140 includes a processor connected to system memory and a communication interface for communicating with controller 102 so that remote server 140 can write to and read from non-volatile memory 104 (via controller 102).

Figure 1B:
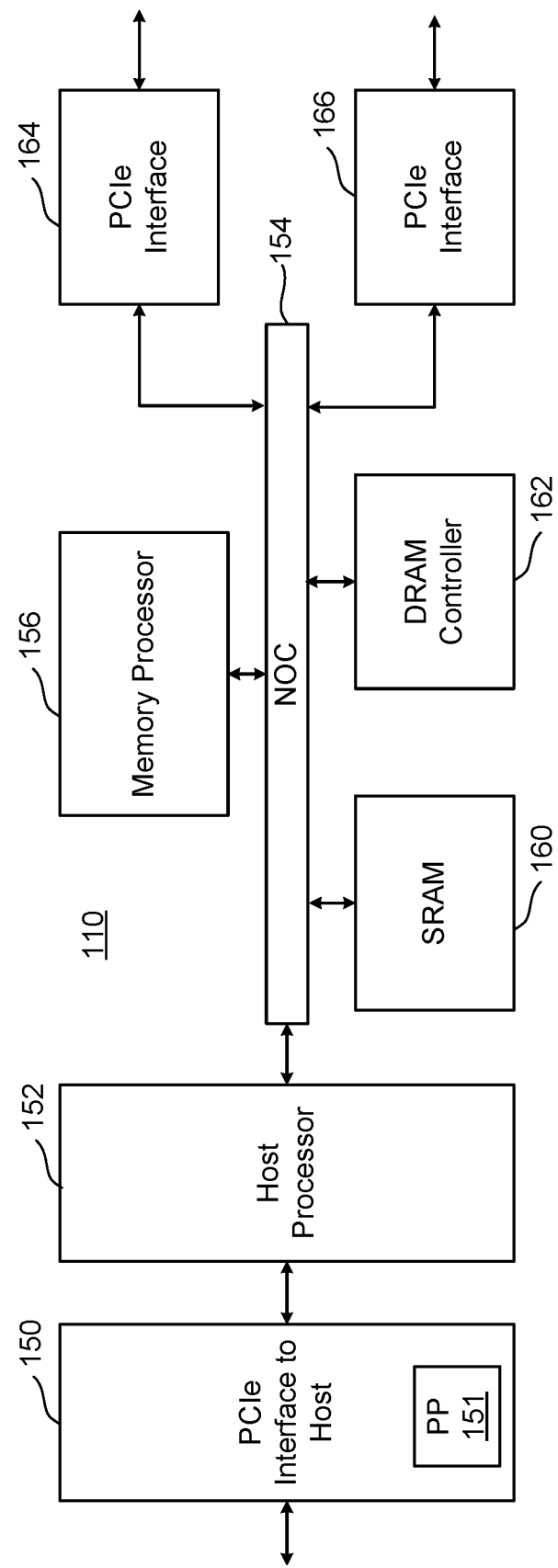
FIG. 1B is a block diagram of one embodiment of a Front-End Processor Circuit. In some embodiments, the Front-End Processor Circuit is part of a Controller.

FIG. 1B is a block diagram of one embodiment of FEP circuit 110. FIG. 1B shows a PCIe interface 150 to communicate with host 120 and a host processor 152 in communication with that PCIe interface. The host processor 152 can be any type of processor known in the art that is suitable for the implementation. Host processor 152 is in communication with a network-on-chip (NOC) 154. A NOC is a communication subsystem on an integrated circuit, typically between cores in a SoC. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is the memory processor 156, SRAM 160 and a DRAM controller 162. The DRAM controller 162 is used to operate and communicate with the DRAM (e.g., DRAM 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 1B, the SSD controller will include two BEP circuits 112; therefore, there are two PCIe Interfaces 164/166. Each PCIe Interface communicates with one of the BEP circuits 112. In other embodiments, there can be more or less than two BEP circuits 112; therefore, there can be more than two PCIe Interfaces.

Figure 1C:
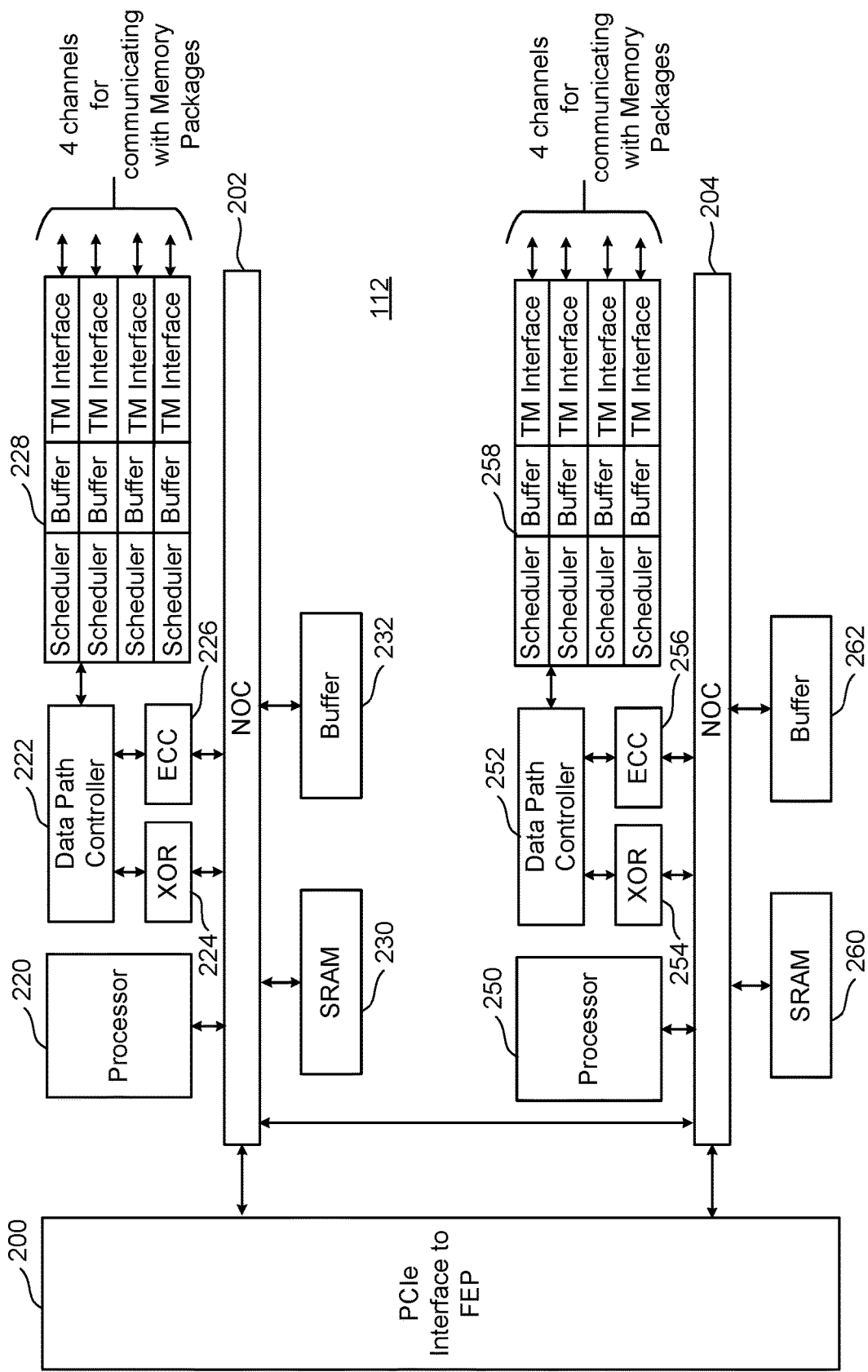
FIG. 1C is a block diagram of one embodiment of a Back-End Processor Circuit. In some embodiments, the Back-End Processor Circuit is part of a Controller.

FIG. 1C is a block diagram of one embodiment of the BEP circuit 112. FIG. 1C shows a PCIe Interface 200 for communicating with the FEP circuit 110 (e.g., communicating with one of PCIe Interfaces 164 and 166 of FIG. 2). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art. The XOR engines 224/254 are used to XOR the data so that data can be combined and stored in a manner that can be recovered in case there is a programming error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer and TM Interface for each of the channels. The processor can be any standard processor known in the art. The data path controllers 222/252 can be a processor, FPGA, microprocessor or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 1D:
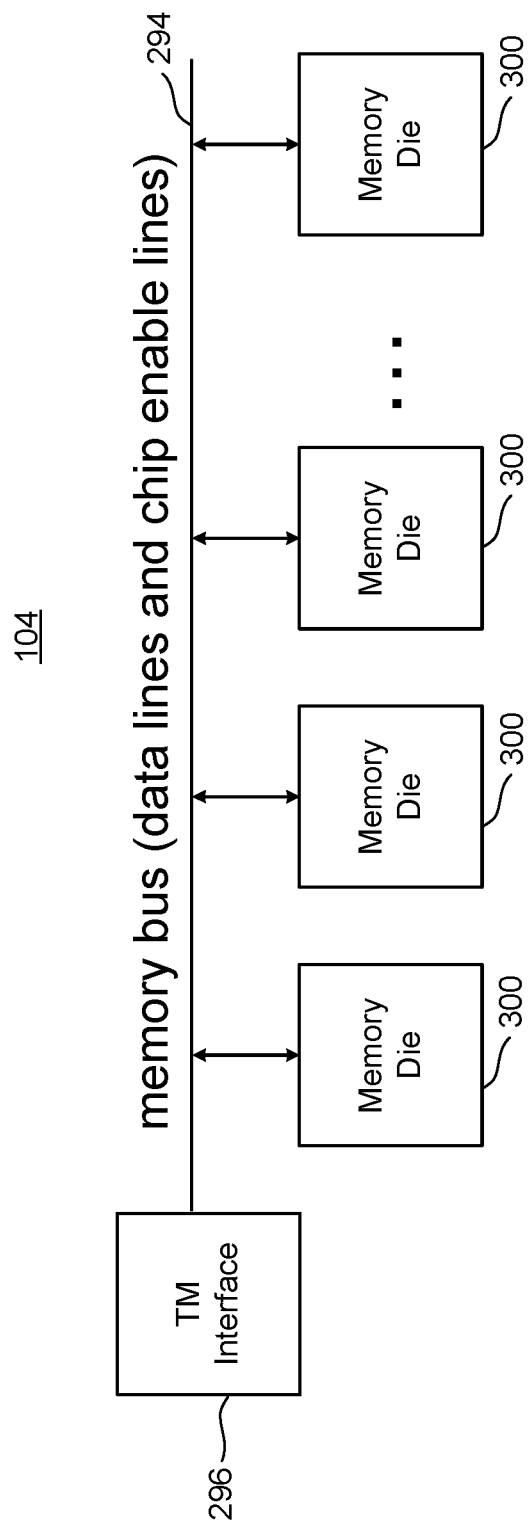
FIG. 1D is a block diagram of one embodiment of a memory package.

FIG. 1D is a block diagram of one embodiment of a non-volatile memory 104 formed as a memory package that includes a plurality of memory die 300 connected to a memory bus 294 (data lines and chip enable lines). The memory bus 294 connects to a Toggle Mode Interface 296 for communicating with the TM Interface of a BEP circuit 112 (see e.g. FIG. 1C). In some embodiments, the memory package can include a small controller connected to the memory bus and the TM Interface. The memory package can have one or more memory die. In one embodiment, each memory package includes eight or 16 memory die; however, other numbers of memory die can also be implemented. The technology described herein is not limited to any particular number of memory die.

Figure 2:
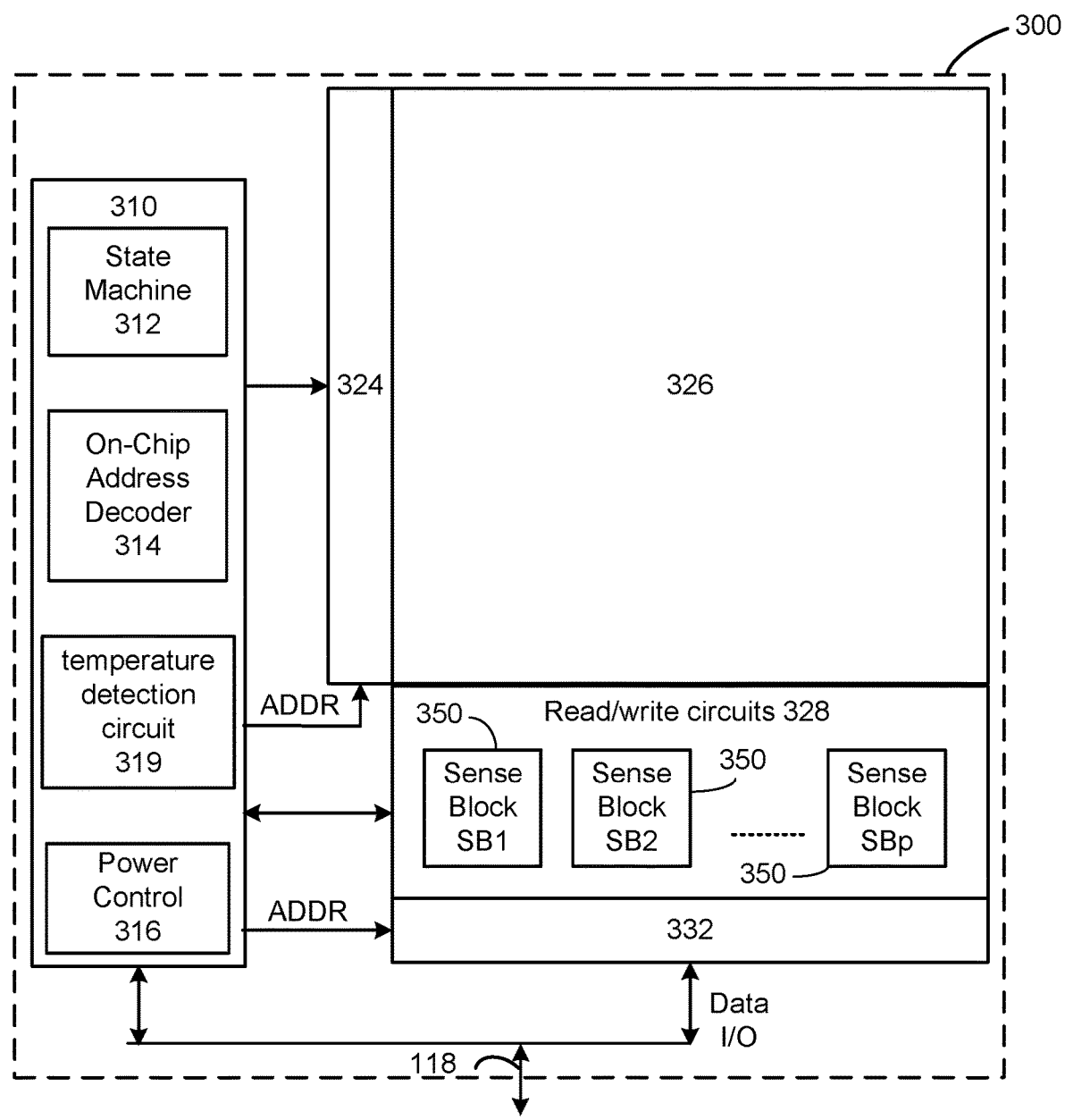
FIG. 2 is a block diagram of one embodiment of a memory die.

FIG. 2 is a functional block diagram of one embodiment of a memory die 300. Each of the one or more memory die 300 of FIG. 1D can be implemented as memory die 300 of FIG. 2. The components depicted in FIG. 2 are electrical circuits. In one embodiment, each memory die 300 includes a memory structure 326, control circuitry 310, and read/write circuits 328, all of which are electrical circuits. Memory structure 326 is addressable by word lines via a row decoder 324 and by bit lines via a column decoder 332. The read/write circuits 328 include multiple sense blocks 350 including SB1, SB2, . . . , SBp (sensing circuitry) and allow a page (or multiple pages) of data in multiple memory cells to be read or programmed in parallel. In one embodiment, each sense block includes a sense amplifier and a set of latches connected to the bit line. The latches store data to be written and/or data that has been read. The sense blocks include bit line drivers.

Commands and data are transferred between the controller and the memory die 300 via lines 318. In one embodiment, memory die 300 includes a set of input and/or output (I/O) pins that connect to lines 318.

Control circuitry 310 cooperates with the read/write circuits 328 to perform memory operations (e.g., write, read, erase, and others) on memory structure 326. In one embodiment, control circuitry 310 includes a state machine 312, an on-chip address decoder 314, a power control module 316 (power control circuit) and a temperature detection circuit 319. State machine 312 provides die-level control of memory operations. In one embodiment, state machine 312 is programmable by software. In other embodiments, state machine 312 does not use software and is completely implemented in hardware (e.g., electrical circuits). In some embodiments, state machine 312 can be replaced by a microcontroller or microprocessor. In one embodiment, control circuitry 310 includes buffers such as registers, ROM fuses and other storage devices for storing default values such as base voltages and other parameters.

The on-chip address decoder 314 provides an address interface between addresses used by controller 102 to the hardware address used by the decoders 324 and 332. Power control module 316 controls the power and voltages supplied to the word lines and bit lines during memory operations. Power control module 316 may include charge pumps for creating voltages.

For purposes of this document, control circuitry 310, alone or in combination with read/write circuits 328 and decoders 324/332, comprise one or more control circuits for memory structure 326. These one or more control circuits are electrical circuits that perform the functions described below in the flow charts and signal diagrams. In other embodiments, the one or more control circuits can consist only of controller 102, which is an electrical circuit in combination with software, that performs the functions described below in the flow charts and signal diagrams. In another alternative, the one or more control circuits comprise controller 102 and control circuitry 310 performing the functions described below in the flow charts and signal diagrams. In another embodiment, the one or more control circuits comprise state machine 312 (or a microcontroller or microprocessor) alone or in combination with controller 102.

In one embodiment, memory structure 326 comprises a monolithic three-dimensional memory array of non-volatile memory cells in which multiple memory levels are formed above a single substrate, such as a wafer. The memory structure may comprise any type of non-volatile memory that is monolithically formed in one or more physical levels of arrays of memory cells having an active area disposed above a silicon (or other type of) substrate. In one example, the non-volatile memory cells of memory structure 326 comprise vertical NAND strings with charge-trapping material such as described, for example, in U.S. Pat. No. 9,721,662, incorporated herein by reference in its entirety. In another embodiment, memory structure 326 comprises a two-dimensional memory array of non-volatile memory cells. In one example, the non-volatile memory cells are NAND flash memory cells utilizing floating gates such as described, for example, in U.S. Pat. No. 9,082,502, incorporated herein by reference in its entirety. Other types of memory cells (e.g., NOR-type flash memory) can also be used.

The exact type of memory array architecture or memory cell included in memory structure 326 is not limited to the examples above. Many different types of memory array architectures or memory cell technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for architectures of memory structure 126 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse, but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
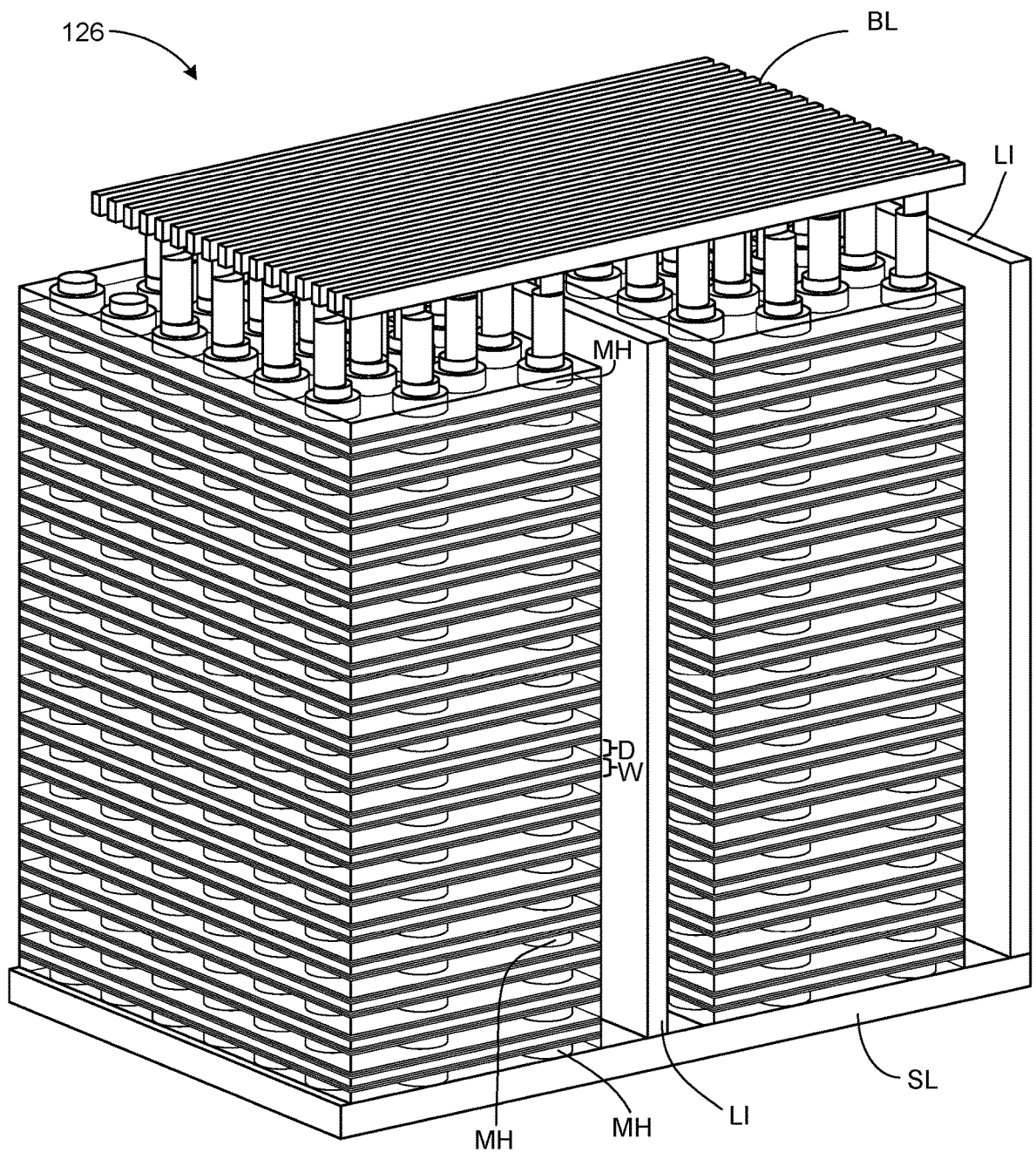
FIG. 3 is a perspective view of a portion of one embodiment of a monolithic three-dimensional memory structure.

FIG. 3 is a perspective view of a portion of one example embodiment of a monolithic three-dimensional memory array that can comprise memory structure 126, which includes a plurality memory cells. For example, FIG. 3 shows a portion of one block of memory. The structure depicted includes a set of bit lines BL positioned above a stack of alternating dielectric layers and conductive layers.

For example purposes, one of the dielectric layers is marked as D and one of the conductive layers (also called word line layers) is marked as W. The number of alternating dielectric layers and conductive layers can vary based on specific implementation requirements. One set of embodiments includes between 108-278 alternating dielectric layers and conductive layers, for example, 127 data word line layers, 8 select layers, 4 dummy word line layers and 139 dielectric layers. More or less than 108-278 layers can also be used. As will be explained below, the alternating dielectric layers and conductive layers are divided into four "fingers" by local interconnects LI. FIG. 3 shows two fingers and two local interconnects LI. Below and the alternating dielectric layers and word line layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping layer to create a vertical column of memory cells. Each memory cell can store one or more bits of data.

Some non-volatile memory systems (e.g., eMMC, UFS, NVMe) have separate partitions defined for BOOT, Replay Protected Memory Block ("RPMB") and User data. For example, memory structure 326 of FIG. 2 may be divided into a boot partition, RPMB partition and a user data partition.

In some embodiments, BOOT and RPMB partitions are configured as Single Level Cell (SLC), storing one bit per memory cell, while a general partition containing user data can be configured as SLC or Multi-Level Cell (MLC), storing more than one bit per cell. Booting related configuration data is stored in the partition reserved for the Boot. Data, which should be secured enough resides in RPMB, such as (for example) DRM Content protection keys and OEM provided/Specific security Keys. Some data stored in an RPMB may be used during booting of a host. Such data may include, for example, image version data that specifies the correct version of code to use (e.g. correct version of host firmware including boot code to use for booting the host or other processor). The user data partition stores data from a user.

The RPMB feature allows an entity (e.g. host SoC [System On a Chip], remote Server, etc.) to write and read data to/from an RPMB partition in a secure manner. For purposes of this document, "secure" means that the write/read are replay protected and only an authorized entity could change the content of the partition. In general, replay protected means that there is protection to ensure that communications cannot be intercepted and replayed, for example, using a nonce to ensure that each RPMB read command and response are uniquely identified or using a write counter to ensure that each RPMB write command and response are uniquely identified. The RPMB feature is based on a symmetric key which resides in both the storage device and the entity (e.g. host SoC, remote server, etc.). Such a key may be a random number such as a 16 or 32 byte number.

In one embodiment, for example, RPMB can withstand replay attacks by requiring a key to write to this region. The RPMB has a key that can be programmed once. Later, the host (or remote server) reads a counter value from the RPMB. It uses this counter value and the programmed key to generate a Message Authentication Code (MAC). The device then checks the MAC given vs the MAC it calculated using the same key, and if it matches, write access is granted.

Typically, the usage of RPMB is by only one entity which is used to both read from and write to the RPMB partition. However, there may be situations where two separate entities with different roles need to access the RPMB partition. For example, the first entity role may be to write to the RPMB partition and the second entity role may be to read from the RPMB partition. In this case, the entities and the non-volatile storage device need to have a shared key. Sharing the key between the first and second entities requires key management schemes which are complex and, if not done correctly, reduce the security level of the entire system. Therefore, technology is proposed below to provide role separation for accessing the RPMB partition. For example, the writing entity could have a high security level and the reading could have a low security level.

One embodiment includes a non-volatile storage system comprises a controller (e.g. controller 102) and a non-volatile memory (e.g. three-dimensional memory structure 126) connected to the controller. The non-volatile memory structure includes a plurality of non-volatile memory cells divided into a boot partition, RPMB partition and a user data partition. The non-volatile storage apparatus is configured to provide role separation for accessing the RPMB partition.

RPMB partition security can be improved in a system that includes a remote server, a host, and a storage device, by separating the RPMB read and write keys. Accordingly, the remote server may have a higher authenticity hierarchy, where the RPMB write key is stored and provided by the remote server only and the RPMB read key is available to the host. The host may program the RPMB read key to the storage device and may not be able to write or modify the RPMB partition.

Examples of the technology are based on configuring a memory system with 2 or more keys for an RPMB (or 2 or more keys per RPMB region in an RPMB that is configured with multiple RPMB regions). The first key may be used to sign write commands from the remote server to authenticate that any data written to the RPMB is from a trusted source. The second key may be used to sign responses to RPMB read commands from at least the host (and in some cases, both host and remote server) to authenticate that read data is from the memory system. Using the multiple key approach, a host (e.g. SoC host) may read RPMB data and use it, and the remote server may write RPMB data in a secure way. Programming of the 2 keys may be done in either one or two phases, e.g. both keys may be loaded into the RPMB together in a secure environment, or the write key may be loaded into the RPMB in a secure environment with the read key loaded later (e.g. with authentication provided by the remote server using the write key).

Figure 4:
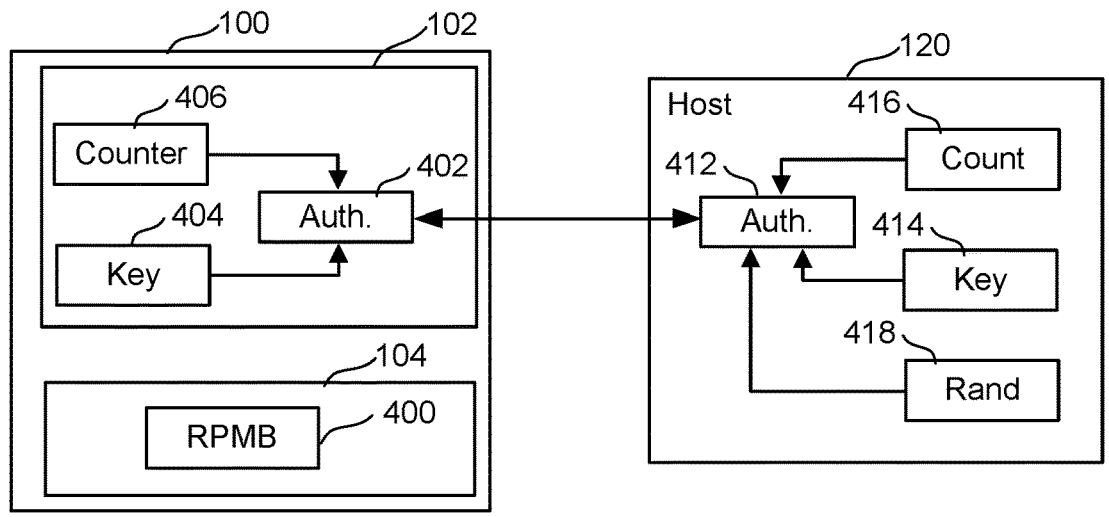
FIG. 4 illustrates an example of a memory system with an RPMB connected to a host.

FIG. 4 shows an example of an RPMB 400 in non-volatile memory 104 of memory system 100. In addition, memory system 100 includes an authentication circuit 402 in controller 102, which is configured to authenticate access to RPMB 400. For example, authentication circuit 402 may authenticate access by host 120 to RPMB 400 using a key 404 and counter 406. Host 120 includes authentication circuit 412 and contains key 414 and a circuit holding a count 416. Keys 404 and 414 are identical in this example (i.e. the consist of the same bits in the same order and may be generated as copies).

When host 120 attempts to write to RPMB 400, authentication circuit 412 of host 120 generates a MAC from key 414 and a message, e.g. by applying a hash function such as SHA256 to key 414 and the message (including write data).

A write count 416 may be included in the message and may be used to generate the MAC. The write count 416 in host 120 may reflect the number of times host 120 has written to RPMB 400 and may be obtained from write counter 406 in memory system 100 (e.g. a request for a write count may be sent and write count 416 may be received from memory system 100 prior to attempting to write to RPMB 400). Host 120 sends the MAC, write count, and message to memory system 100. In response, authentication circuit 402 generates a MAC from key 404 and the received message and compares this MAC with the MAC received from host 120 (i.e. with MAC generated by authentication circuit 412). If keys 404 and 414 are identical and the message is unchanged then the corresponding MACs will be identical and authentication circuit 402 grants write access to host 120 to write data in RPMB 400. Controller 102 may proceed to execute the write command from host 120 and write data from host 120 in RPMB 400. Counter 406 is then incremented (i.e. counter 406 is a write counter that is incremented when a write occurs to RPMB 400) and a response is sent to host 120 indicating completion of the write. If the MACs are not identical (e.g. where another entity other than host 120 attempts to write in RPMB 400) then authentication circuit 402 denies write access. No new data is written in RPMB 400 in this case. A response may be sent to indicate that authentication failed. If write counts are not identical (e.g. in a replay attack) then authentication circuit 402 denies write access to host 120 to write in RPMB 400 and no new data is written in RPMB 400. A response may be sent to indicate that the write counts did not match.

When host 120 attempts to read data from RPMB 400, host 120 sends a read access request with address information indicating addresses of data to be read from RPMB 400 along with a nonce or random number generated by random number generator 418. In response, memory system 100 may read the requested data from RPMB 400. Authentication circuit 402 calculates a MAC (e.g. using a hash function such as SHA256) from key 404 and a read response message (e.g. message including: response type, nonce, address, read data, and result) and sends the MAC to host 120 with the message including the read data. Authentication circuit 412 in host 120 then generates another MAC from key 414 and the received message and compares this MAC with the MAC received from memory system 100. If the two MACs are identical and the received message is unchanged then the read data from RPMB 400 may be considered authenticated (i.e. authenticated as coming from memory system 100 and not some other entity). Host 120 may then use the read data. If the two MACs are not identical (e.g. because the read data is from an entity other than memory system 100) then the read data may not be considered authenticated and the read data may be discarded (not used). A response may be sent to indicate a failure to authenticate the read data.

While the example of FIG. 4, using a symmetric key which resides in both the memory system and the host, may be used in various arrangements where one entity (such as a host) writes and reads data in RPMB, in some cases, it may be desirable to provide write authentication to one entity (e.g. to limit write access exclusively to one entity) while providing read authentication to a different entity or entities, which may not have write access. For example, a remote server may have write access to update data in an RPMB while read authentication may be provided for read data sent to a local processor, such as a processor in a host. Thus, for example, where an RPMB is in a memory system in a cell phone, a remote server controlled by the cell phone manufacturer or network operator may have exclusive write access while the host (cell phone) does not have write access (but can read from the RPMB with authentication). This arrangement may allow secure updating of data in the RPMB from the remote server and provide secure reading of data from the RPMB by the host. Providing authentication in such a configuration using key sharing would require a key management scheme, which may be complex and may reduce security of the entire system. Providing RPMB read and write authentication to different entities, without using such a complex key management scheme, presents a technical problem and using separate read and write keys provides a technical solution to this problem.

Figure 5:
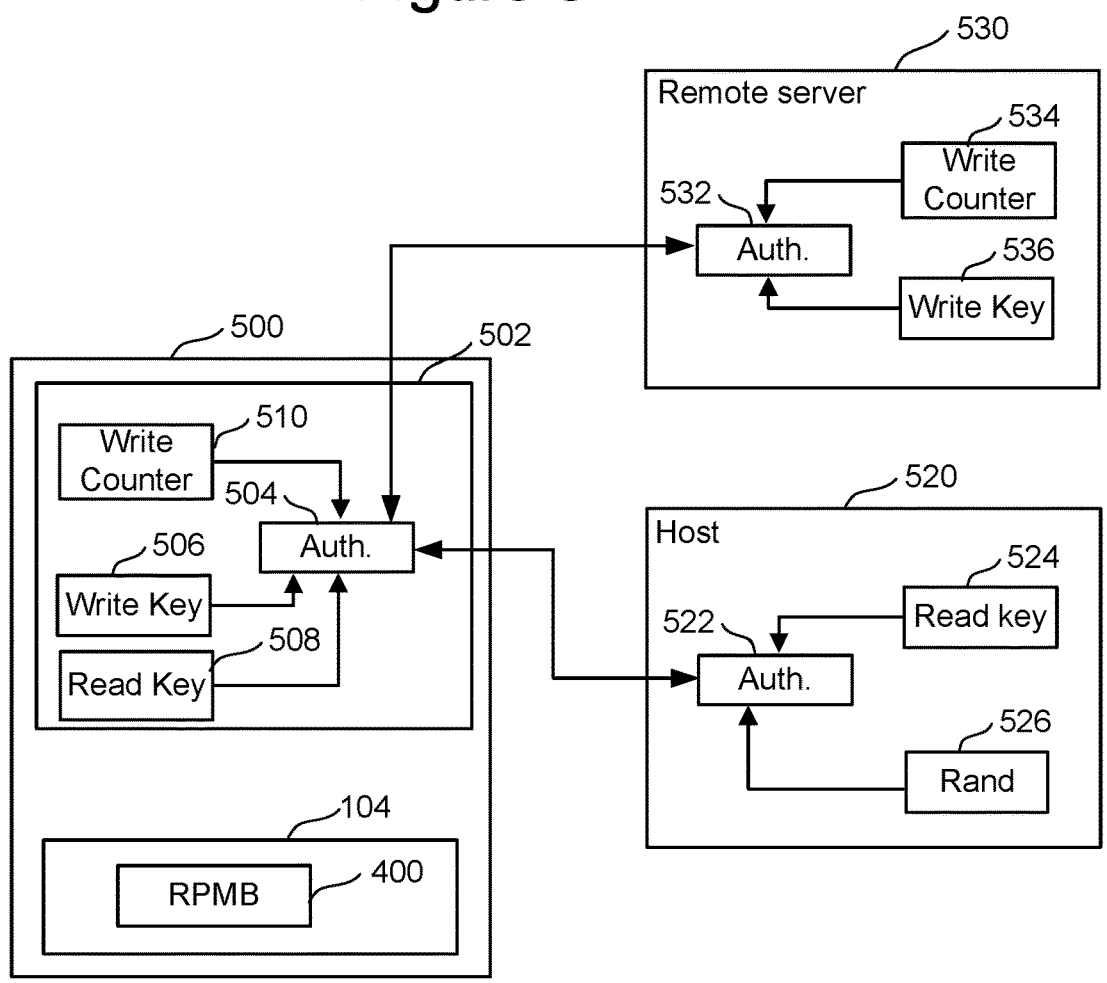
FIG. 5 illustrates an example of a memory system with separate read and write keys for an RPMB.

FIG. 5 shows an example of a memory system 500 that includes RPMB 400 in non-volatile memory 104 as previously described (e.g. in FIGS. 2-4) and a controller 502 configured to provide separate read and write authentication for RPMB 400. Controller 502 includes authentication circuit 504, which provides authentication using a write key 506, read key 508, and write counter 510. Controller 502 may include additional components as described with respect to controller 102 (e.g. in FIGS. 1A-D) and may be implemented by configuring controller 102 appropriately. Memory system 500 is connected to host 520, which includes authentication circuit 522, read key 524, and random number generator 526. Host 520 may be implemented by appropriate configuration of host 120. Memory system 500 is connected to remoter server 530 which includes authentication circuit 532, a circuit holding write count 534, and write key 536. Remote server 530 may be implemented by appropriate configuration of remote server 140.

In the example of FIG. 5, write access to RPMB 400 is limited exclusively to remote server 530, so that other entities (including host 520) do not have write access to RPMB 400 and cannot change any data stored in RPMB 400. When remote server 530 attempts to write to RPMB 400 in the example of FIG. 5, authentication circuit 532 of remote server 530 generates a MAC from write key 536 and a message (e.g. from write access request, which may include write data) e.g. by applying a hash function such as SHA256 to write key 536 and the message. A write count 534 (number of writes to RPMB 400) is also used to generate the MAC. The write count 534 in remote server 530 may reflect the number of times remote server 530 has written to RPMB 400 and may be obtained from write counter 510 in memory system 500 (e.g. a request for a write count may be made prior to attempting to write to RPMB 400). Generating the MAC authenticates the write data of the message and authentication circuit 532 may be considered a means for authenticating at the remote server that write data is from the remote server using a write key. Remote server 530 sends the MAC, write count, and message to memory system 500. In response, authentication circuit 504 generates a MAC from write key 506 and the received message and compares this MAC with the MAC received from remote server 530 (i.e. with MAC generated by authentication circuit 532). If write keys 506 and 536 are identical and the message is unchanged then the corresponding MACs will be identical and authentication circuit 504 grants write access to remote server 530 to write data in RPMB 400. Controller 502 may proceed to execute the write command from remote server 530 and write data from remote server 530 in RPMB 400. Write counter 510 is then incremented and a response is sent to remote server 530 indicating completion of the write. If the MACs are not identical (e.g. where another entity other than remote server 530 attempts to write in RPMB 400) then authentication circuit 504 denies write access to write in RPMB 400. No new data is written in RPMB 400 in this case. A response may be sent to indicate that authentication failed. If write counts are not identical then authentication circuit 504 denies write access to write in RPMB 400 and no new data is written in RPMB 400. A response may be sent to indicate that the write counts did not match.

In the example of FIG. 5, host 520 has read access to RPMB 400 but does not have write access. Accordingly, host 520 does not include a write key. Host 520 contains read key 524, which is different from write key 506 and may be used to allow read access to RPMB 400. When host 520 attempts to read data from RPMB 400, host 520 sends a read access request with address information indicating addresses of data to be read from RPMB 400 along with a nonce or random number generated by random number generator 526. In response, memory system 500 may read the requested data from RPMB 400. Authentication circuit 504 calculates a MAC (e.g. using a hash function such as SHA256) from read key 508 and a read response message (e.g. message including: response type, nonce, address, read data, and result) and sends the MAC to host 520 with the message including the read data. Authentication circuit 522 in host 520 then generates another MAC from read key 524 and the received message and compares this MAC with the MAC received from memory system 500. If the two MACs are identical and the received message is unchanged then the read data from RPMB 400 may be considered authenticated (i.e. authenticated as coming from memory system 100 and not some other entity). Host 520 may then use the read data. If the two MACs are not identical (e.g. because the read data is from an entity other than memory system 500) then the read data may not be considered authenticated and the read data may be discarded (not used). Thus, authentication circuit 522 may be considered a means for authenticating at a local processor (processor of host 520) that read data is from the RPMB 400 using a read key (e.g. read key 524).

In some cases, read access to an RPMB may be exclusive to a single entity (e.g. host 520). In other cases, more than one entity may have read access. For example, an entity having write access to an RPMB (e.g. remote server 530) may also have read access. Remote server 530 may contain a read key, or write key 536 may be used to provide read access in addition to write access (i.e. may act as a combined read/write key).

Separate read and write authentication using separate read and write keys respectively (e.g. read key 506 and write key 508) presents a technical solution to the technical problem of providing RPMB read and write authentication to different entities, without using a complex key management scheme. This technical solution improves the operation of a memory system (e.g. memory system 500) by providing separate read and write access, without complex key management, in a secure manner that protects against unauthorized writing in RPMB and ensures data read from RPMB is authentic.

Figure 6:
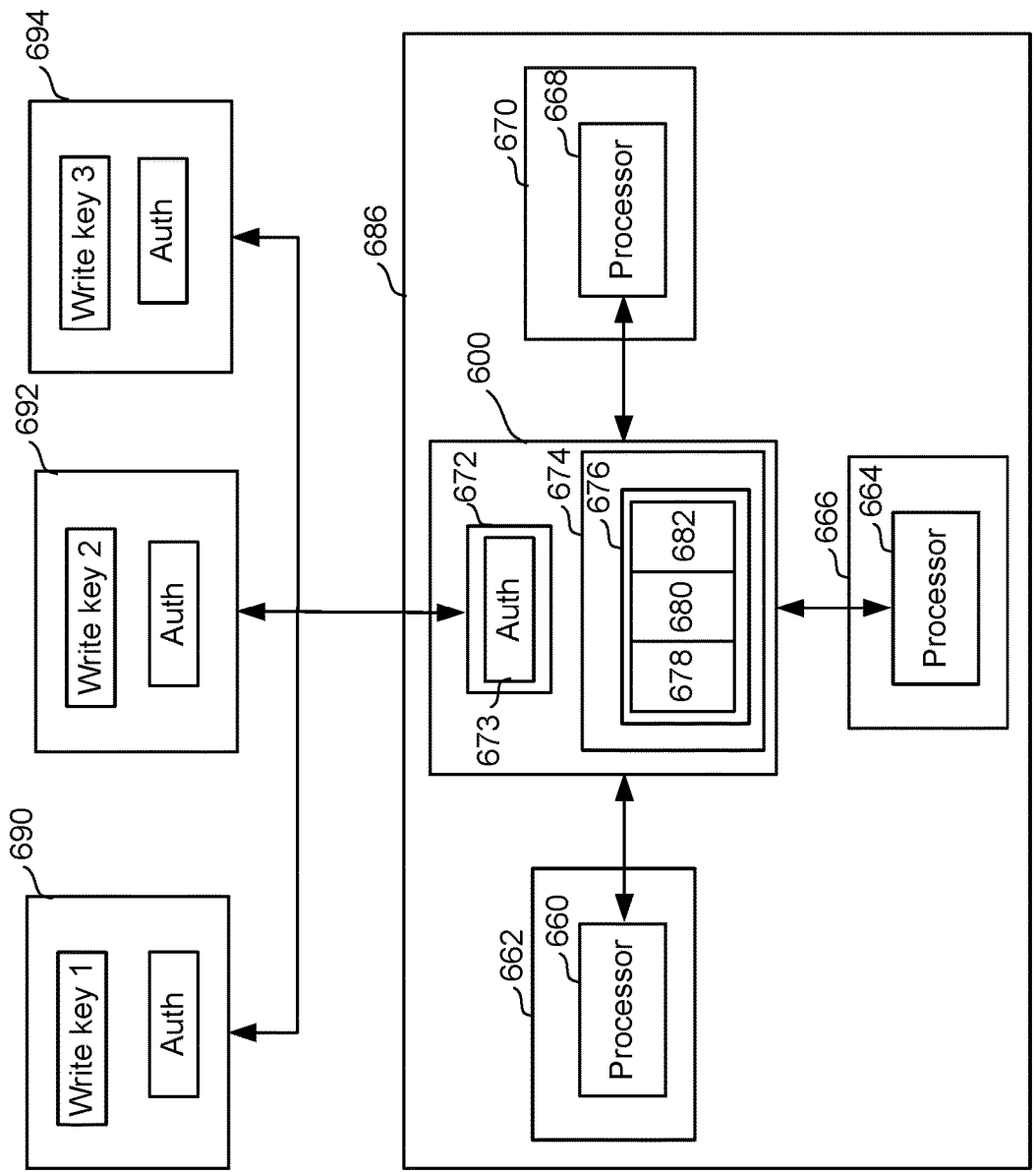
FIG. 6 illustrates an example of a memory system with different RPMB regions corresponding to different processors.

While the example of FIG. 5 shows memory system 500 coupled to host 520, in some other arrangements, a memory system may serve multiple entities instead of a single host (e.g. multiple local processors instead of just a host processor). FIG. 6 shows an example of a memory system 600 coupled to processor 660 in system 662, processor 664 in system 666, and processor 668 in system 670. Memory system 600 includes controller 672, which includes an authentication circuit 673, which uses separate read and write keys as described with respect to controller 502 of FIG. 5. Memory system 600 also includes non-volatile memory 674, which may be similar to non-volatile memory 104 (e.g. with structure shown in FIG. 3). Non-volatile memory 674 includes RPMB 676, which includes three RPMB regions 678, 680, 682, which are assigned to processors 660, 664, and 668 respectively.

In the arrangement shown in FIG. 6, memory system 600 acts as a shared memory system for systems 662, 666, 670. The systems shown are subsystems of a larger assembly 686. For example, assembly 686 may be a vehicle (car, truck, bus, or the like) and systems 662, 666, 670 may be subsystems (Electronic Control Units, or "ECUs") such as a brake system, steering system, ignition system, fuel injection system, security system, navigation system, entertainment system, air conditioning/heating system, or similar vehicle systems, each having their own processor (processors 660, 664, 668) while sharing memory system 600. Each processor may authenticate data read from its respective RPMB region using a region-specific read key (i.e. processor 660 may have a first read key for RPMB region 678, processor 664 may have a second read key for RPMB region 680, and processor 668 may have a third read key for RPMB region 682). In addition, write access to respective RPMB regions 678, 680, 680 may be provided to remote servers 690, 692, 694 respectively using corresponding write keys and authentication circuits in remote servers 690, 692, 694 and in memory system 600. Remote server 690 has write key 1, which provides exclusive write access to RPMB region 678, which is read by processor 660. Remote server 692 has write key 2, which provides exclusive write access to RPMB region 680, which is read by processor 664. Remote server 694 has write key 3, which provides exclusive write access to RPMB region 682, which is read by processor 668. For example, each remote server may be controlled by a manufacturer of a corresponding vehicle system of assembly 686 to allow centralized secure updates to RPMB regions of the vehicle systems as needed from a remote location. RPMB regions may contain data for local processors (processors 660, 664, 668) such as image version data, keys, certificates, etc.

In order to use read and write keys as described above, the keys may be loaded into RPMB so that they are available for use by authentication circuits. Loading of keys is generally done in a secure manner to ensure that keys are authentic and are not intercepted. Loading of read and write keys may be performed together, at the same time, or at different times. An authentication circuit such as authentication circuit 673 (or authentication circuit 504) may be considered a means for providing at the memory system separate read authentication and write authentication for an individual RPMB region such that write access to an individual RPMB region is limited exclusively to a remote server and read authentication to the individual RPMB region is provided to one or more local processors.

FIG. 7 illustrates an example of loading a write key into a memory system 700 (e.g. memory system 500 or 600) from a server 702, which may be a remote server (e.g. remote server 530, 690, 692, 694) that later has write access to memory system 700). Loading of the RPMB write key occurs within a secure environment 704 such as a physically secure location, e.g. a manufacturing or test facility. The RPMB write key may be written to a system area of a non-volatile memory in a manner that ensures that the RPMB write key cannot be altered or copied. Server 702 sends a RPMB write key programming request 706 to memory system 700. Memory system 700 sends a response 708. Then, server 702 sends a result read request 710 to confirm writing of the RPMB write key and memory system 700 sends a response 712 providing confirmation.

An RPMB write key may be written in a manner that ensures that it remains secure after writing. For example, an RPMB write key may be provided as an attribute in memory systems that support attributes. An example implementation using an attribute to implement an RPMB write key is illustrated in FIG. 8. This example is based on the JEDEC Universal Flash Storage (UFS) specification (UFSv2.1 standard) which specifies certain attributes and specifies read and write access properties of each attribute. The bottom row of the table of FIG. 8 is an attribute named "RPMBRegion1WriteKey" and has properties "WriteOnce, WriteOnly, Persistent." Thus, an RPMB write key can only be written once and is persistent across power cycles, resets, and other events. A write key can be configured as an attribute during product configuration. After it is written, it cannot be changed. Properties of other RPMB regions write keys may be similarly specified. While attributes are a convenient manner of specifying read and write access properties of RPMB keys, other systems may also be used.

An RPMB write key may be written in the same manner as an RPMB read key (e.g. as illustrated in FIGS. 7-8) or may be written differently. For example, RPMB read and write keys may be written in a secure environment during manufacturing, testing, or initialization, or only the RPMB write key may be written in such a secure environment, with a read key (or read keys) being written at some later time, e.g. when a memory system is coupled with a host (e.g. host 520), or with processors (e.g. processors 660, 664, 668). Copies of RPMB read and write keys may be held in a secure manner in entities that use them to access an RPMB (e.g. a write key stored in a secure environment in a remote server or a read key stored in a secure environment in a host or local). Different levels of security may be applied to different keys used by different entities (e.g. higher security for a write key than for a read key).

Figure 9:
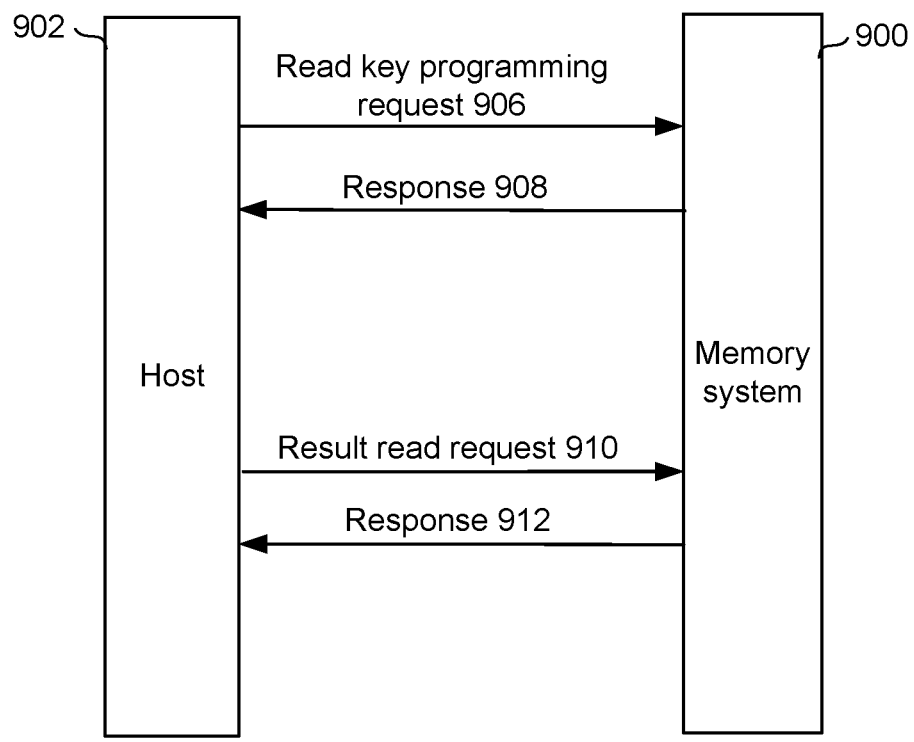
FIG. 9 illustrates an example of programming a read key for an RPMB.

FIG. 9 illustrates an example of writing an RPMB read key by a host 902 (e.g. cell phone, laptop, tablet, server, camera, etc.) to a memory system 900, which may occur during installation of memory system 900 in host 902 (e.g. installing a memory system, such as a memory card or SSD in a host). The RPMB read key may be written to a system area of non-volatile memory in memory system 900 in a manner that ensures that the RPMB read key cannot be altered or copied. Host 902 sends the RPMB read key programming request 906 to memory system 900. Memory system 900 sends a response 908, e.g. an acknowledgement that read key programming request 906 was received. Then, host 902 sends a result read request 910 to confirm writing of the RPMB read key and memory system 900 sends a response 912 providing confirmation that the read key is written. In systems where multiple processors use a common memory system (e.g. as shown in FIG. 6), each processor may write a corresponding RPMB read key for its RPMB region. In some cases, multiple read keys may be used for the same RPMB region. For example, different processors may have read access to an RPMB region using different RPMB read keys. More than one RPMB write key may also be used to provide write access to more than one entity (e.g. to a car manufacturer and to a fleet manager). Using different RPMB read and/or write keys avoids key sharing and may allow separate management of access by different entities to an RPMB region (e.g. a key may be revoked for a particular entity while a key to the same region may remain valid for another entity).

After RPMB read and write keys are written in a memory system, secure read and write access to corresponding RPMB regions may occur. In general, RPMB regions are used to store various sensitive data such as credentials, keys, root certificate, root reference, image version data such as a reference number or other indicator specifying a firmware code version, and other data which may raise security concerns.

Figure 10A:
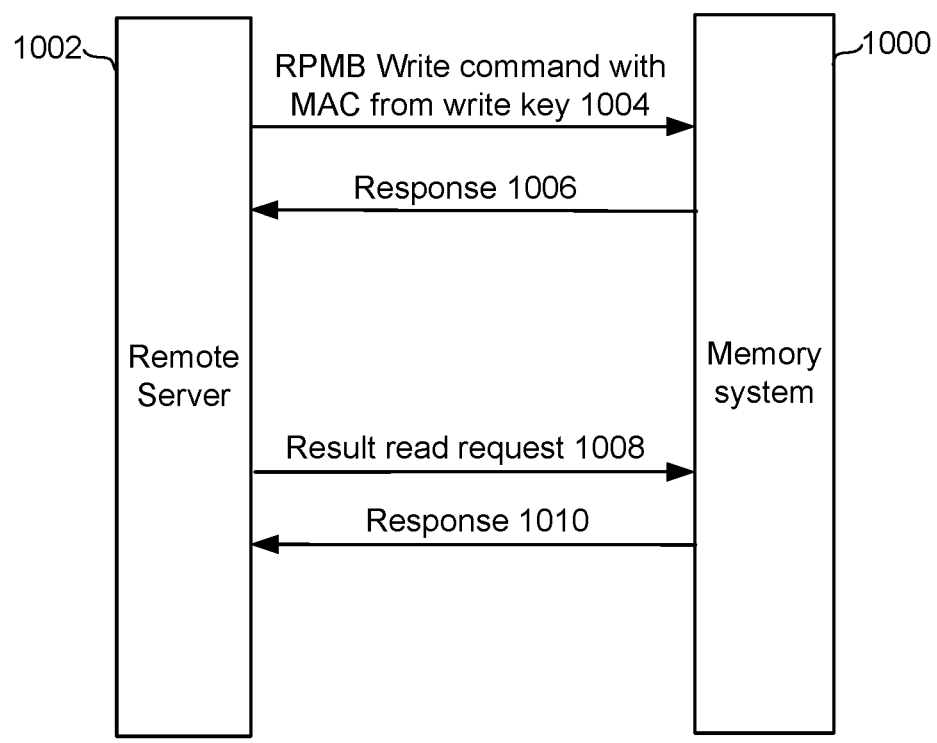
FIGS. 10A-B illustrate writing data in an RPMB.

FIG. 10A illustrates an example of writing by a remote server 1002 in an RPMB in non-volatile memory of a memory system 1000 (e.g. remote server 530 writing in RPMB 400 of memory system 500, or one of remote servers 690, 692, 694 writing in RPMB 676 of memory system 600). Remote server 1002 sends an RPMB write command with a MAC calculated from the write key 1004. The memory system then sends a response 1006. For example, the response may indicate that write access is granted or denied according to the MAC sent by remote server 1002. When write access is granted, memory system 1000 writes the data sent with the write command in the RPMB. The remote server then sends a result read request 1008 to verify that the write command was successfully executed and that the data was written. Memory system 1000 sends response 1010 to confirm that the data was written.

Figure 10B:
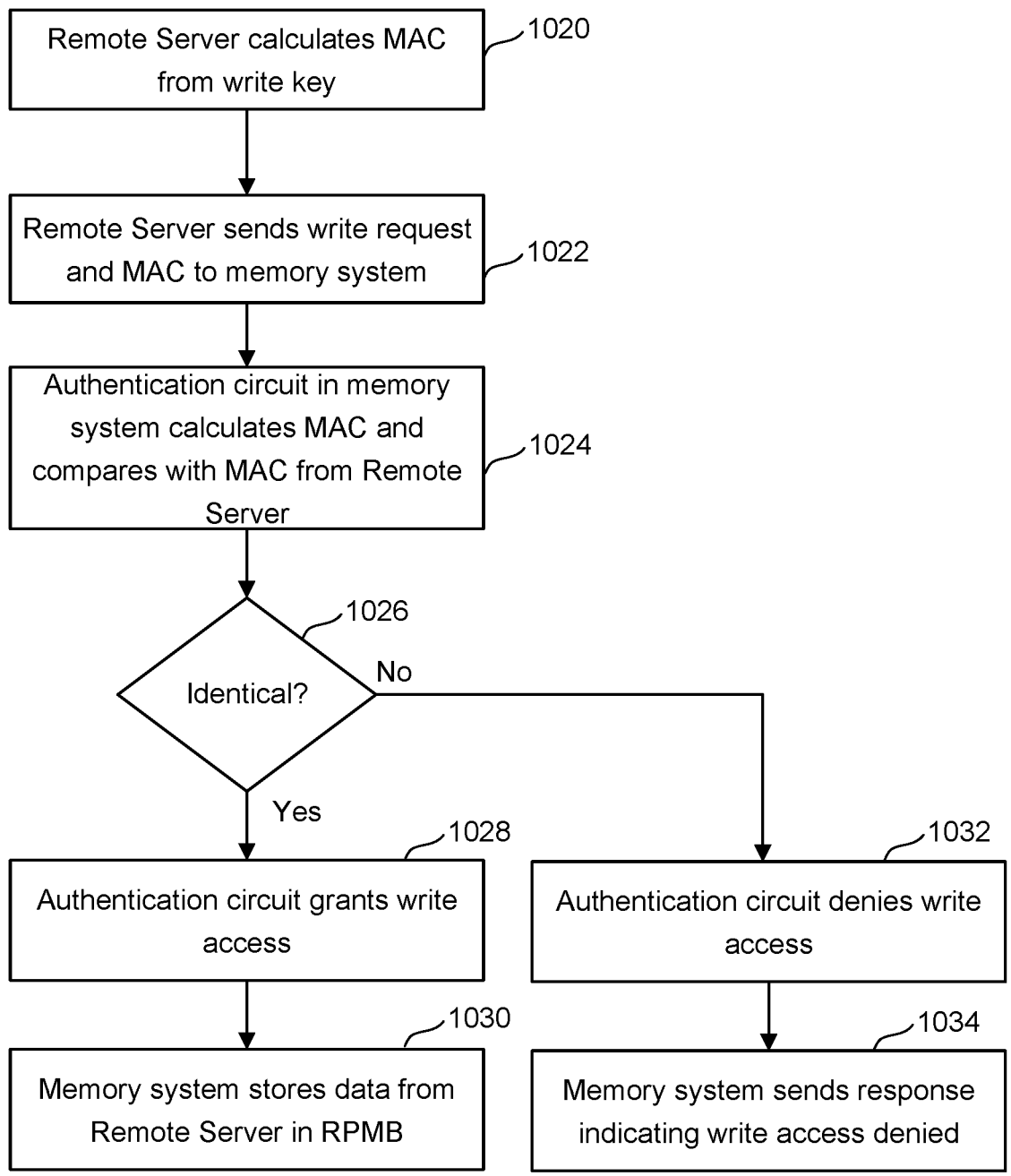

FIG. 10B provides a more detailed illustration of some steps of RPMB writing by a remote server (e.g. writing by remote server 1002 in RPMB in memory system 1000 illustrated in FIG. 10A). A remote server calculates a MAC (first MAC) from a write key 1020, e.g. from the write key and a write count (the write count may be obtained by requesting it from the memory system). The remote server sends a write request and the MAC to the memory system 1022. An authentication circuit in the memory system calculates a MAC (second MAC) using the write key and compares this MAC with the MAC from the remote server 1024 (i.e. compares first MAC and second MAC). A determination is made as to whether these MACs are identical 1026. If the MACs are identical, then the authentication circuit grants write access 1028 and the memory system stores data from the remote server in the RPMB 1030. If the MACs are not identical, then the authentication circuit denies write access 1032 and the memory system sends a response indicating that write access is denied 1034.

Figure 11A:
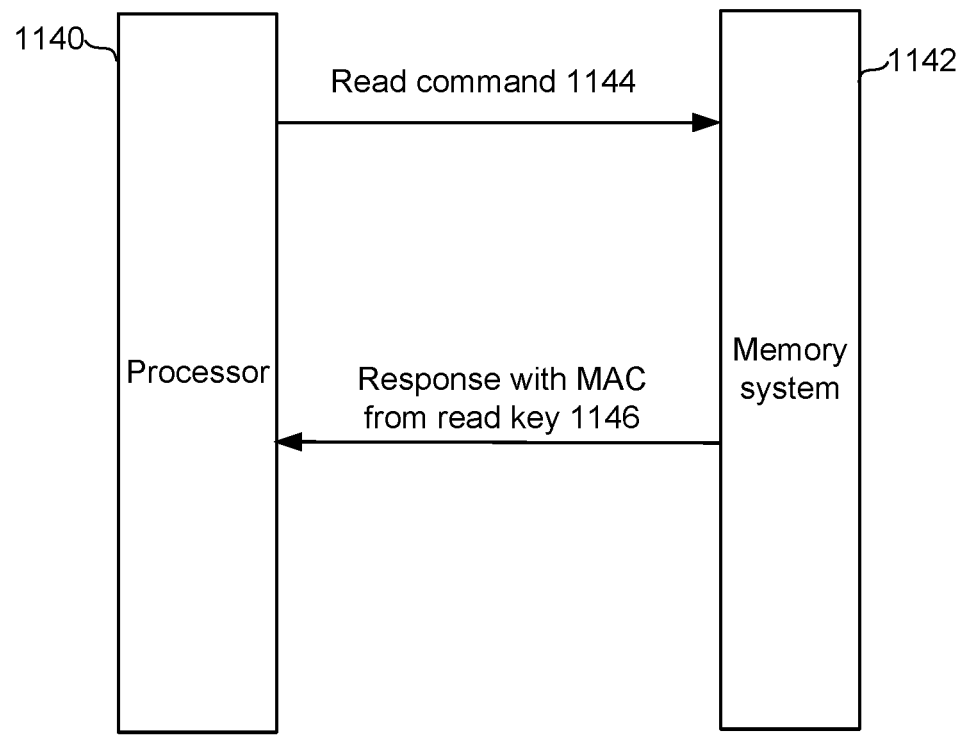
FIGS. 11A-B illustrate reading data from an RPMB.

FIG. 11A illustrates an example of a processor 1140 reading data from an RPMB in non-volatile memory of a memory system 1142 (e.g. processor of host 520 reading from RPMB 400, or one of processors 660, 664, 668 reading from respective RPMB regions 678, 680, 682 of RPMB 676). A read command 1144 (RPMB read command) is sent from processor 1140 to memory system 1142. A nonce (e.g. obtained from a random number generator in processor 1140) is sent with read command 1144 along with read addresses and any other parameters. Memory system 1142 includes a read key and sends a response with a MAC calculated from the read key 1146 and from the nonce sent with read command 1144. The response may include data read from non-volatile memory in memory system 1142. Processor 1140 calculates another MAC from the read key and the nonce and compares this MAC with the MAC received from memory system 1142 for authentication.

Figure 11B:
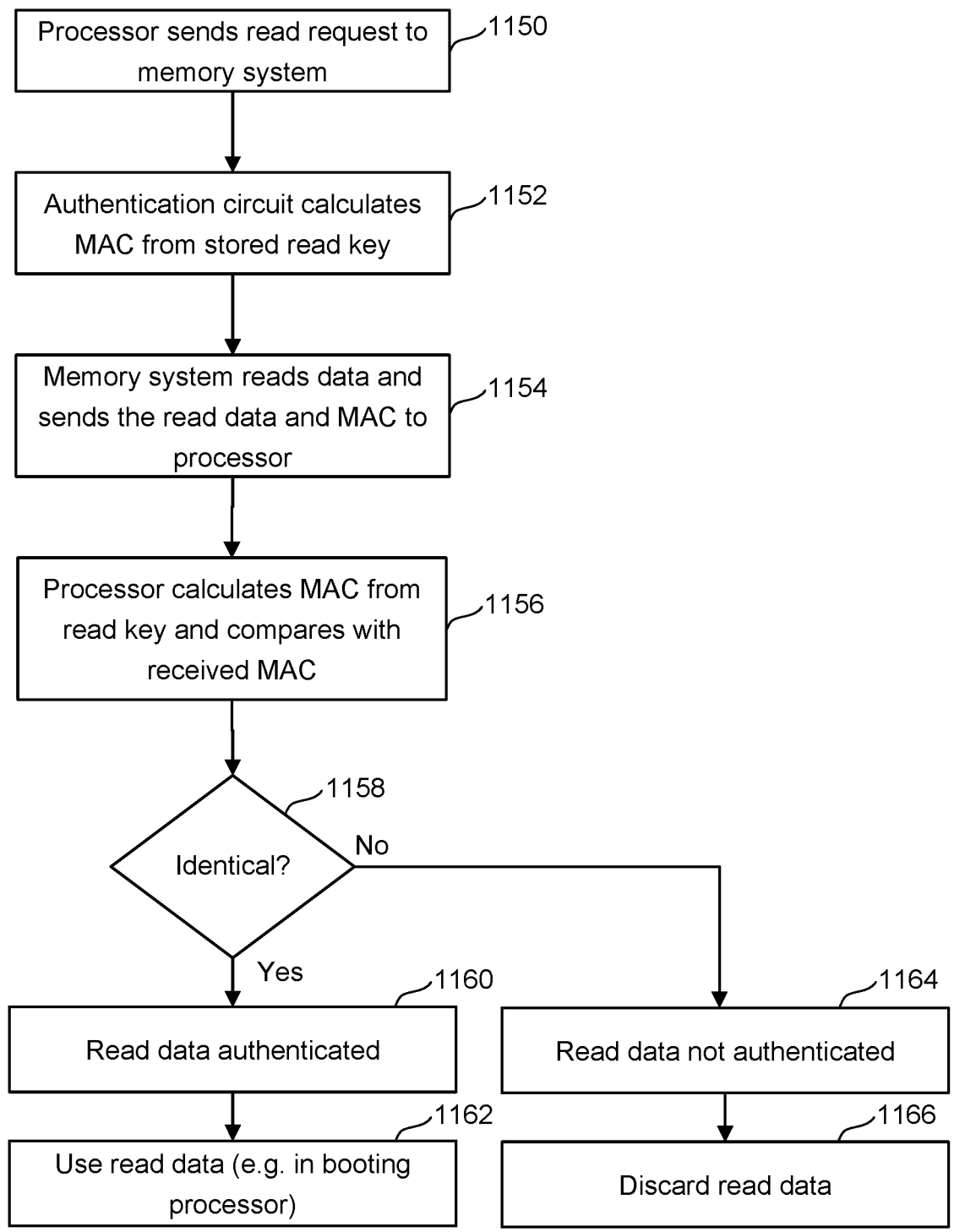

FIG. 11B provides a more detailed illustration of some steps of RPMB reading by a processor (e.g. processor 1140 reading data from an RPMB in a non-volatile memory of memory system 1142 as illustrated in FIG. 11A). A processor (e.g. processor 1140) sends a read request to a memory system 1150 (e.g. to memory system 1142). The read request includes a nonce (e.g. generated by the processor). An authentication circuit in the memory system calculates a MAC from a stored read key 1152, e.g. from a read key stored in non-volatile memory in the memory system and from the nonce received from the processor. The memory system reads data (data specified by the read request) and sends the read data and MAC (third MAC) to the processor 1154. The processor calculates a MAC (fourth MAC) from the read key (e.g. copy of read key at the processor along with the nonce previously sent with the read request) and compares with the received MAC 1156 (i.e. compares third MAC with fourth MAC). A determination is made as to whether the third and fourth MACs are identical 1158. If the third and fourth MACs are identical, the read is authenticated 1160 and the processor may use the read data (e.g. in booting the processor) 1162. For example, where the RPMB data read from the RPMB includes image version data such as a boot code version for booting the processor, the processor may compare this with the version of boot code stored in non-volatile memory and may use this boot code to boot if the boot code versions match. If the third and fourth MACs are not identical, then the read data is not authenticated 1164 and the read data is discarded 1166, i.e. the read data received cannot be trusted and is not used. For example, any read data, such as a boot code version, is not used as this data may not be authentic.

Figure 12A:
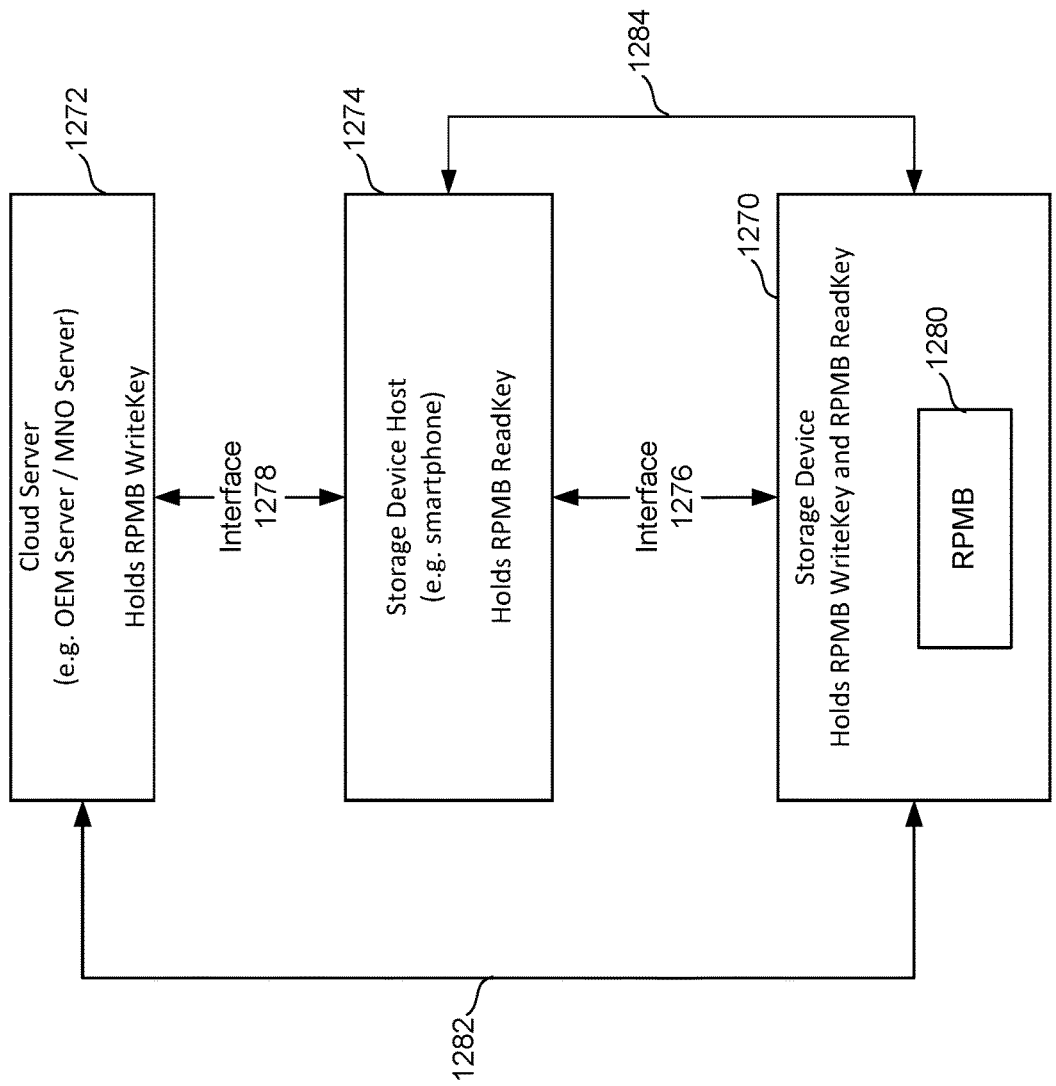
FIGS. 12A-C illustrate an example of RPMB operation with a server and host.
Figure 12C:
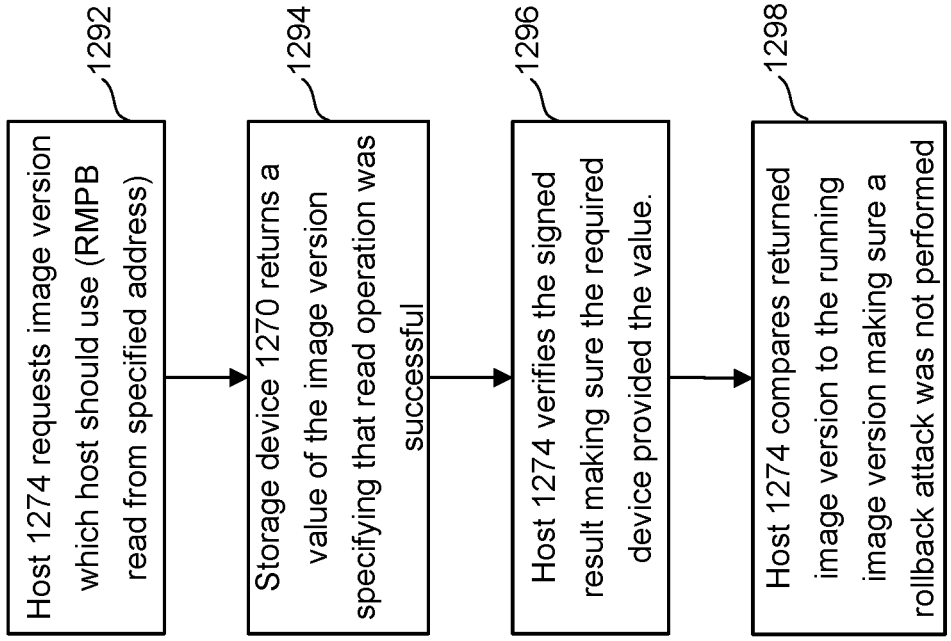
Figure 12B:
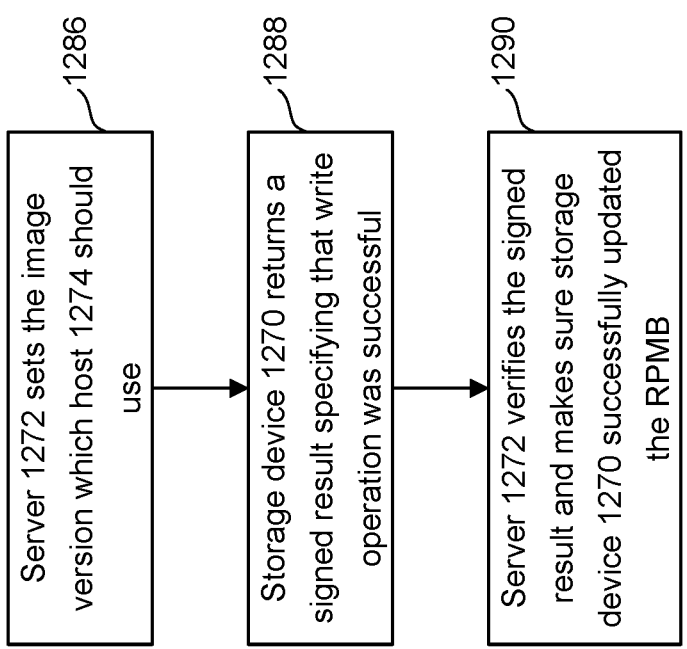

FIGS. 12A-C illustrate an implementation of a memory system coupled to a host and server, which may be considered an example implementation of memory system 500 coupled to remote server 530 and host 520 as illustrated in FIG. 5. This implementation provides protection against rollback attack. FIG. 12 includes a storage device 1270 (e.g. memory system that includes non-volatile memory such as a memory card or embedded memory system) that is coupled to a storage device host 1274 (e.g. a smartphone) through a first interface 1276, such as a UFS, eMMC, or NVMe interface. Storage device host 1274 is also coupled to cloud server 1272 (an example of a remote server) via interface 1278, e.g. LTE, Wi-Fi, or other such interface. Storage device 1270 holds RPMB write and read keys, "RPMB WriteKey" and "RPMB ReadKey" respectively, e.g. in a system area of non-volatile memory. Storage device 1270 also includes RPMB 1280 as a dedicated portion of non-volatile memory that is secured by the write and read keys. Storage device host 1274 holds a copy of RPMB ReadKey while cloud server 1272 (e.g. an OEM server, MNO server, or other such server) holds a copy of RPMB write key. This allows interactions 1282 between cloud server 1272 and storage device 1270 to be secured using the RPMB WriteKey while interactions 1284 between storage device host 1274 and storage device 1270 may be secured using the RPMB ReadKey.

FIG. 12B illustrates an example of interactions between cloud server 1272 and storage device 1270 (i.e. an example of interactions 1282 of FIG. 12A). Cloud server 1272 sets the image version which host 1274 should use 1286, for example, by writing a value at an address in RPMB 1280 indicating the image version. The image version may include the boot code version for use during booting of host 1274 and/or other code or data to be used by host 1274. Storage device 1270 returns a signed result specifying that write operation was successful 1288 (using the write key and write counter to authenticate cloud server 1272). Cloud server 1272 verifies the signed result and makes sure storage device 1270 successfully updated the RPMB 1290.

FIG. 12C illustrates an example of interactions between host 1274 and storage device 1270 (i.e. an example of interactions 1284 of FIG. 12A). Host 1274 requests the image version which it should use by performing an RPMB read from a specified address 1292, e.g. from the address in RPMB 1280 that is used for image version data, which was previously written by cloud server 1272. Storage device 1270 returns a value of the image version specifying that the read operation was successful 1294. Host 1274 verifies the signed result making sure the required device provided the value 1296 (e.g. using the read key to ensure that the value of the image version was not sent from some entity other than storage device 1270 and thus authenticating the image version value). Host 1274 compares the returned image version to the running image version making sure a rollback attack was not performed 1298. For example, host 1274 compares image version value read from RPMB (and authenticated using the read key) and the running image version that is in use or to be used (e.g. boot code in boot partition) to ensure that the code that it is running or about to run is the correct version of the code and that the code has not been downgraded or rolled back as part of an attack. While the example of FIGS. 12A-C is directed to preventing a rollback attack, other examples exist, e.g. a server may set X.509 root certificates in RPMB which the host may subsequently use to verify other certificates in the certificate chain, etc.

Figure 13:
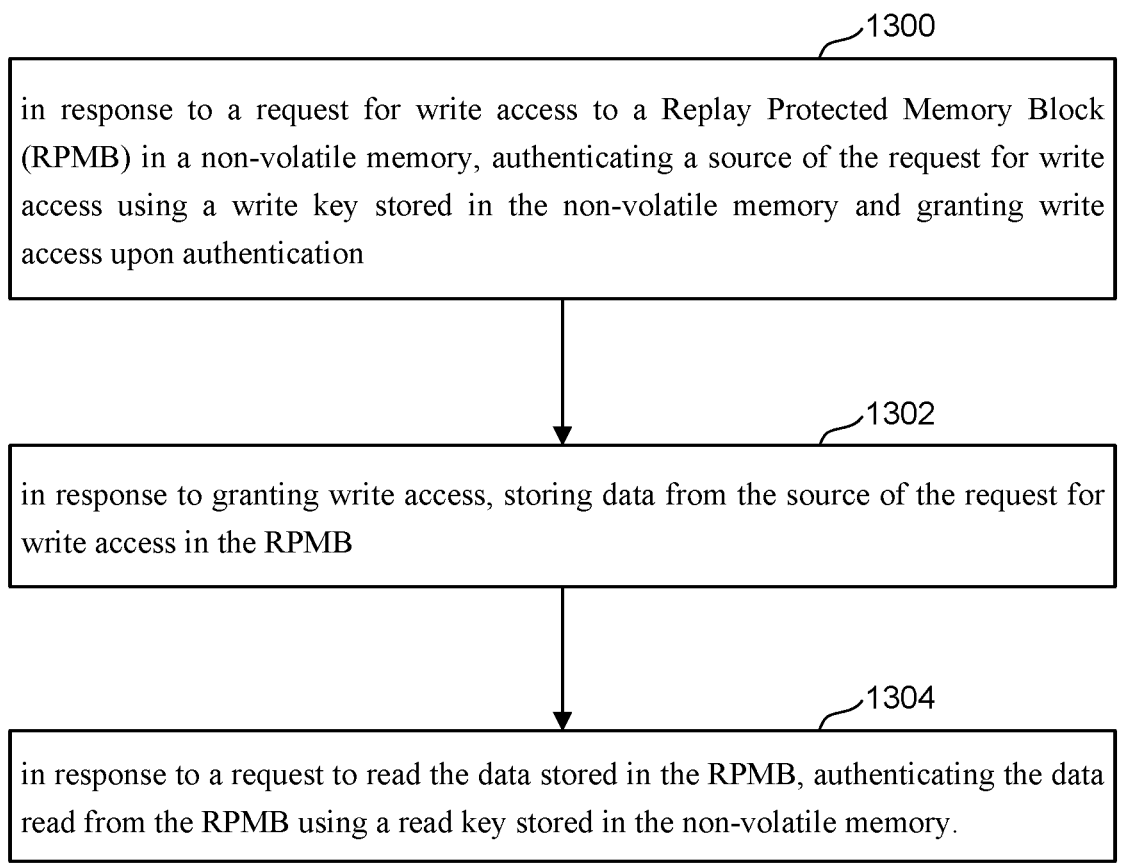
FIG. 13 illustrates a method of using RPMB read and write keys.

FIG. 13 illustrates an example of a method that may be implemented using components shown in FIG. 5, 6, or 12A for example. The method includes, in response to a request for write access to a Replay Protected Memory Block (RPMB) in a non-volatile memory, authenticating a source of the request for write access using a write key stored in the non-volatile memory and granting write access upon authentication 1300. For example, a MAC received with the write request may be compared with a MAC calculated from the write key and a write counter. The method also includes, in response to granting write access, storing data from the source of the request for write access in the RPMB 1302 and in response to a request to read the data stored in the RPMB, authenticating the data read from the RPMB using a read key stored in the non-volatile memory 1304. Thus, different RPMB write and read keys provide different access to different entities.

An example of an apparatus includes: a plurality of non-volatile memory cells including a Replay Protected Memory Block (RPMB) formed in the plurality of non-volatile memory cells; and control circuitry configured to authenticate access to the RPMB with a plurality of keys including authentication of write access to the RPMB through a write key and authentication of read access to the RPMB through a read key.

The write key may authenticate write access to the RPMB and limit write access exclusively to a remote server that contains a copy of the write key and the read key may authenticate data read from the RPMB in response to an RPMB read command. The control circuitry may be configured to maintain a write counter and authenticating write access to the RPMB may include generating a Message Authentication Code (MAC) from the write key and the write counter. The entity may be a remote server that holds the write key in a first secure environment and read access may be provided to another entity that holds a copy of the read key in a second secure environment. The control circuitry may be further configured to generate a Message Authentication Code (MAC) from the read key in combination with a nonce received with the RPMB read command and send the MAC in response to the RPMB read command. The RPMB may contain image version data for a processor, the control circuitry configured to allow changes to the image version data only by a remote server using the write key and to authenticate the image version data to the processor using the read key. The apparatus may be located in a vehicle, the RPMB may contain image version data for a processor of a vehicle system, the control circuitry configured to allow changes to the image version data only by an entity using the write key and authenticate the image version data to the processor of the vehicle system using the read key. The apparatus may be coupled to a plurality of vehicle systems as a shared memory system, the RPMB may contain data for processors of the plurality of vehicle systems, the plurality of keys including a plurality of read keys and a plurality of write keys for the plurality of vehicle systems. The RPMB may include a plurality of RPMB regions, an individual RPMB region associated with a corresponding vehicle system, the control circuitry configured to authenticate write access to the individual RPMB region through a corresponding write key and authenticate read access to the individual RPMB region through a corresponding read key. Write access to each of the plurality of RPMB regions may be exclusive to a corresponding remote server of a plurality of remote servers that contain corresponding write keys, RPMB data for a processor of an individual vehicle system configurable only by a corresponding remote server.

An example of a method includes: in response to a request for write access to a Replay Protected Memory Block (RPMB) in a non-volatile memory, authenticating a source of the request for write access using a write key stored in the non-volatile memory and granting write access upon authentication; in response to granting write access, storing data from the source of the request for write access in the RPMB; and in response to a request to read the data stored in the RPMB, authenticating data read from the RPMB using a read key stored in the non-volatile memory.

The method may include: in response to authenticating the data read from the RPMB, comparing a first image version of code stored in the non-volatile memory with a second image version specified in the data read from the RPMB; and in response to determining that the first image version and the second image version match, using the code stored in the non-volatile memory. The non-volatile memory may be in a vehicle, the request to read the data stored in the RPMB may be from a processor in a vehicle system in the vehicle, the code stored in the non-volatile memory may be boot code for the processor, and using the code stored in the non-volatile memory may include using the code to boot the processor. The RPMB may contain a plurality of RPMB regions, an individual RPMB region associated with a corresponding vehicle system, each RPMB region having a corresponding write key, write counter, and read key, authenticating a source of write access to an individual RPMB region may use a corresponding write key and write counter for the individual RPMB region, and authenticating read access to the individual RPMB region may use a corresponding read key for the individual RPMB region. The method may include: in response to authenticating the source of the request for write access, incrementing a write counter. Authenticating the source of the request for write access may include generating a Message Authentication Code (MAC) from the write key and the write counter and authenticating the data read from the RPMB may include generating a MAC from the read key and a nonce. The method may include: loading the write key into the RPMB while the non-volatile memory is in a secure location; maintaining a copy of the write key in a remote server; and subsequently sending the request for write access to the RPMB from the remote server using the write key to authenticate the remote server as the source of the request for write access. Sending the request for write access may include sending from the remote server a first Message Authentication Code (MAC) calculated from the copy of the write key in the remote server and a first write count, authenticating the source of the request for write access may include calculating a second MAC using the write key stored in the non-volatile memory and a second write count stored in the non-volatile memory and comparing the first MAC and the second MAC, and authenticating the data read from the RPMB may include calculating a third MAC using the read key stored in the non-volatile memory and a nonce, calculating a fourth MAC using a copy of the read key maintained by a processor and the nonce and comparing the third MAC and the fourth MAC, and in response to determining the third MAC is identical to the fourth MAC, the processor using the data read from the RPMB.

An example of a memory system includes: a Replay Protected Memory Block (RPMB) formed in a plurality of non-volatile memory cells, the RPMB containing one or more RPMB regions; and means for providing at the memory system separate read authentication and write authentication for an individual RPMB region such that write access to an individual RPMB region is limited exclusively to a remote server and read authentication to the individual RPMB region is provided to one or more local processors.

The memory system may include: means for authenticating at a local processor that read data is from the RPMB using a read key; and means for authenticating at the remote server that write data is from the remote server using a write key.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
control circuitry configured to authenticate access to a Replay Protected Memory Block (RPMB) formed in a plurality of non-volatile memory cells with a plurality of keys including:
authentication of write access to the RPMB through a write key to limit write access to a first entity that contains a copy of the write key in a secure environment; and
authentication of read access to the RPMB through a read key in response to a RPMB read command from a second entity that contains a copy of the read key.

2. The apparatus of claim 1 wherein the RPMB includes a plurality of regions, the first entity is a remote server that has exclusive write access to a first RPMB.

3. The apparatus of claim 2 wherein the control circuitry is further configured to authenticate access to a second RPMB region with another write key to provide another remote server that contains a copy of the other write key with exclusive write access to the second RPMB region.

4. The apparatus of claim 1 wherein the control circuitry is further configured to maintain a write counter and authenticating write access to the RPMB includes generating a Message Authentication Code (MAC) from the write key and the write counter.

5. The apparatus of claim 1 wherein the control circuitry is further configured to generate a Message Authentication Code (MAC) from the read key in combination with a nonce received with the RPMB read command and send the MAC in response to the RPMB read command.

6. The apparatus of claim 1 wherein the RPMB contains image version data for a processor, the control circuitry configured to allow changes to the image version data only by a remote server using the write key and to authenticate the image version data to the processor using the read key.

7. The apparatus of claim 1 wherein the apparatus is located in a vehicle, the RPMB contains image version data for a processor of a vehicle system, the control circuitry configured to allow changes to the image version data only by an entity using the write key and authenticate the image version data to the processor of the vehicle system using the read key.

8. The apparatus of claim 7 wherein the apparatus is coupled to a plurality of vehicle systems as a shared memory system, the RPMB contains data for processors of the plurality of vehicle systems, the plurality of keys including a plurality of read keys and a plurality of write keys for the plurality of vehicle systems.

9. The apparatus of claim 8 wherein the RPMB includes a plurality of RPMB regions, an individual RPMB region associated with a corresponding vehicle system, the control circuitry configured to authenticate write access to the individual RPMB region through a corresponding write key and authenticate read access to the individual RPMB region through a corresponding read key.

10. The apparatus of claim 9 wherein write access to each of the plurality of RPMB regions is exclusive to a corresponding remote server of a plurality of remote servers that contain corresponding write keys, RPMB data for a processor of an individual vehicle system configurable only by a corresponding remote server.

11. A method comprising:
in response to a request for write access to a Replay Protected Memory Block (RPMB) in a non-volatile memory, authenticating a source of the request for write access using a write key stored in the non-volatile memory and granting write access upon authentication;
in response to granting write access, storing data from the source of the request for write access in the RPMB;
in response to a request to read the data stored in the RPMB, authenticating data read from the RPMB using a read key stored in the non-volatile memory and comparing a first image version of code stored in the non-volatile memory with a second image version specified in the data read from the RPMB; and
in response to authenticating and determining that the first image version and the second image version match, using the code stored in the non-volatile memory.

12. The method of claim 11 wherein the source of the request for write access is a remote server that has exclusive access to at least a portion of the RPMB.

13. The method of claim 11 wherein the non-volatile memory is in a vehicle, the request to read the data stored in the RPMB is from a processor in a vehicle system in the vehicle, the code stored in the non-volatile memory is boot code for the processor, and using the code stored in the non-volatile memory includes using the code to boot the processor.

14. The method of claim 13 wherein the RPMB contains a plurality of RPMB regions, an individual RPMB region associated with a corresponding vehicle system, each RPMB region having a corresponding write key, write counter, and read key, authenticating a source of write access to an individual RPMB region uses a corresponding write key and write counter for the individual RPMB region, and authenticating read access to the individual RPMB region uses a corresponding read key for the individual RPMB region.

15. The method of claim 11 further comprising:
in response to authenticating the source of the request for write access, incrementing a write counter.

16. The method of claim 15 wherein authenticating the source of the request for write access includes generating a Message Authentication Code (MAC) from the write key and the write counter and authenticating the data read from the RPMB includes generating a MAC from the read key and a nonce.

17. The method of claim 11 further comprising:
loading the write key into the RPMB while the non-volatile memory is in a secure location;
maintaining a copy of the write key in a remote server; and
subsequently sending the request for write access to the RPMB from the remote server using the write key to authenticate the remote server as the source of the request for write access.

18. The method of claim 17 wherein sending the request for write access includes sending from the remote server a first Message Authentication Code (MAC) calculated from the copy of the write key in the remote server and a first write count, authenticating the source of the request for write access includes calculating a second MAC using the write key stored in the non-volatile memory and a second write count stored in the non-volatile memory and comparing the first MAC and the second MAC, and authenticating the data read from the RPMB includes calculating a third MAC using the read key stored in the non-volatile memory and a nonce, calculating a fourth MAC using a copy of the read key maintained by a processor and the nonce and comparing the third MAC and the fourth MAC, and in response to determining the third MAC is identical to the fourth MAC, the processor using the data read from the RPMB.

19. A memory system, comprising:

a Replay Protected Memory Block (RPMB) formed in a plurality of non-volatile memory cells, the RPMB containing one or more RPMB regions; and means for providing at the memory system separate read authentication and write authentication for an individual RPMB region such that write access to an individual RPMB region is limited exclusively to a remote server and read authentication to the individual RPMB region is provided to one or more local processors.

20. The memory system of claim 19 further comprising:

means for authenticating at a local processor that read data is from the RPMB using a read key; and means for authenticating at the remote server that write data is from the remote server using a write key.

\* \* \* \* \*